US008718647B2

(12) United States Patent
Maheshwari

(10) Patent No.: US 8,718,647 B2
(45) Date of Patent: May 6, 2014

(54) METHOD AND APPARATUS FOR PRIORITIZING STATUS MESSAGES IN A WIRELESS COMMUNICATION SYSTEM

(75) Inventor: Shailesh Maheshwari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 506 days.

(21) Appl. No.: 12/484,969

(22) Filed: Jun. 15, 2009

(65) Prior Publication Data

US 2009/0318152 A1 Dec. 24, 2009

Related U.S. Application Data

(60) Provisional application No. 61/074,325, filed on Jun. 20, 2008.

(51) Int. Cl.
*H04W 36/00* (2009.01)
(52) U.S. Cl.
USPC ............................ 455/436; 370/331; 370/338
(58) Field of Classification Search
CPC ............ H04W 36/00; H04W 36/0005; H04W 36/0011
USPC .......................................... 455/436; 370/338
See application file for complete search history.

(56) References Cited

U.S. PATENT DOCUMENTS

| 4,766,536 A * | 8/1988 | Wilson et al. ................. 710/121 |
| 2004/0037224 A1 | 2/2004 | Choi et al. |
| 2005/0105499 A1 | 5/2005 | Shinozaki et al. |
| 2008/0080432 A1* | 4/2008 | Lu et al. ........................ 370/335 |
| 2008/0080464 A1 | 4/2008 | Speight |
| 2008/0089464 A1 | 4/2008 | Rietzel |
| 2009/0042573 A1* | 2/2009 | Vedantham et al. .......... 455/436 |
| 2009/0316637 A1* | 12/2009 | Yi et al. ......................... 370/329 |
| 2010/0034167 A1 | 2/2010 | Umesh et al. |

FOREIGN PATENT DOCUMENTS

| EP | 1361689 A1 | 11/2003 |
| EP | 1531587 A1 | 5/2005 |
| EP | 1903820 A1 | 3/2008 |
| JP | 2005151013 A | 6/2005 |

(Continued)

OTHER PUBLICATIONS

International Search Report and Written Opinion—PCT/US2009/048057—ISA/EPO—Nov. 13, 2009.

(Continued)

*Primary Examiner* — Marcos Batista
(74) *Attorney, Agent, or Firm* — Dalei Dong

(57) ABSTRACT

Systems and methodologies are described that facilitate scheduling for transmissions of status messages, such as Packet Data Convergence Protocol (PDCP) status messages or Radio Link Control (RLC) acknowledgement messages, in a wireless communication system. As described herein, at time periods at which transmission of status messages is desired, respective status signaling associated with a set of radio bearers, logical channels, or the like can be configured to be transmitted prior to conducting transmission(s) of data. By doing so, a receiving entity can obtain the status signaling at substantially the earliest possible opportunity, allowing the receiving entity to avoid unnecessary bandwidth and/or memory expenditure associated with re-transmissions of information. As further described herein, status information can be prioritized by the use of separate status bearers, respective indicators provided within information elements queued on respective radio bearers, a maintained list of respective radio bearers containing status information, and other similar mechanisms.

44 Claims, 17 Drawing Sheets

(56) References Cited

FOREIGN PATENT DOCUMENTS

| KR | 20080026470 A | 3/2008 |
|---|---|---|
| RU | 2251219 C2 | 4/2005 |
| TW | 200814601 A | 3/2008 |
| WO | WO2008035935 A1 | 3/2008 |
| WO | 2008053972 A1 | 5/2008 |

OTHER PUBLICATIONS

Taiwan Search Report—TW098120653—TIPO—Jun. 19, 2012.

* cited by examiner

METHOD AND APPARATUS FOR PRIORITIZING STATUS MESSAGES IN A WIRELESS COMMUNICATION SYSTEM

CROSS-REFERENCE

This application claims the benefit of U.S. Provisional Application Ser. No. 61/074,325, filed Jun. 20, 2008, and entitled "PRIORITIZATION OF PDCP STATUS MESSAGES IN LTE AFTER HANDOVER," the entirety of which is incorporated herein by reference.

BACKGROUND

I. Field

The present disclosure relates generally to wireless communications, and more specifically to techniques for managing a handover operation in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

Devices in a wireless communication system, such as terminals, base stations, etc., can communicate by encapsulating information into respective packets that can be transmitted over predetermined resources in time, frequency, code, or the like. Further, respective packets can be configured such that a receiving entity can be made aware of the existence of missed and/or otherwise incorrectly received packets and, in some cases, request re-transmission of such packets.

In one example, packet re-transmission can be requested during a handover of a terminal from a source network cell to a target network cell via status messages at the terminal and/or the target cell. However, due to various factors, such as scheduler configuration at the terminal and/or target cell, transmission of status messages can in some cases be delayed or omitted following a handover. Without the benefit of such status messages, it can be appreciated that an entity to which a device transmits status messages may acquire little to no information relating to missed packets for which re-transmission is desired. This lack of status information can cause a given network device to re-transmit substantially no data, which in turn can result in data loss at an entity receiving packets. Alternatively, a lack of status information can cause a network device to conduct redundant re-transmission of a significant amount of data already correctly obtained by an entity receiving the data, which can result in unnecessary bandwidth consumption. Accordingly, it would be desirable to implement improved re-transmission management techniques that mitigate at least the above shortcomings.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying data to be transmitted over one or more communication channels; locating status information associated with respective communication channels among the identified data; detecting a triggering event on which status information is to be transmitted; and transmitting the located status information upon detecting the triggering event prior to transmission of at least a portion of remaining identified data.

A second aspect relates to a wireless communications apparatus, which can comprise a memory that stores data relating to one or more radio bearers and respective information associated with the one or more radio bearers, the information comprising at least one of status messages or data. The wireless communications apparatus can further comprise a processor configured to identify respective status messages among the information associated with the one or more radio bearers and to prioritize the respective status messages such that the status messages are transmitted prior to data associated with the one or more radio bearers.

A third aspect described herein relates to an apparatus operable in a wireless communication system. The apparatus can comprise means for identifying information to be transmitted over one or more logical channels; means for classifying the identified information into status signaling and data; and means for assigning priority levels to the identified information such that information classified as status signaling is transmitted prior to information classified as data upon detecting a triggering event for status transmission.

A fourth aspect described herein relates to a computer program product, which can comprise a computer-readable medium that includes code for causing a computer to identify one or more radio bearers and respective information queued on the one or more radio bearers, the information comprising at least one of status messages or data; code for causing a computer to identify respective status messages among the information queued on the one or more radio bearers; and code for causing a computer to prioritize the respective status messages such that the status messages are transmitted prior to data queued on the one or more radio bearers.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
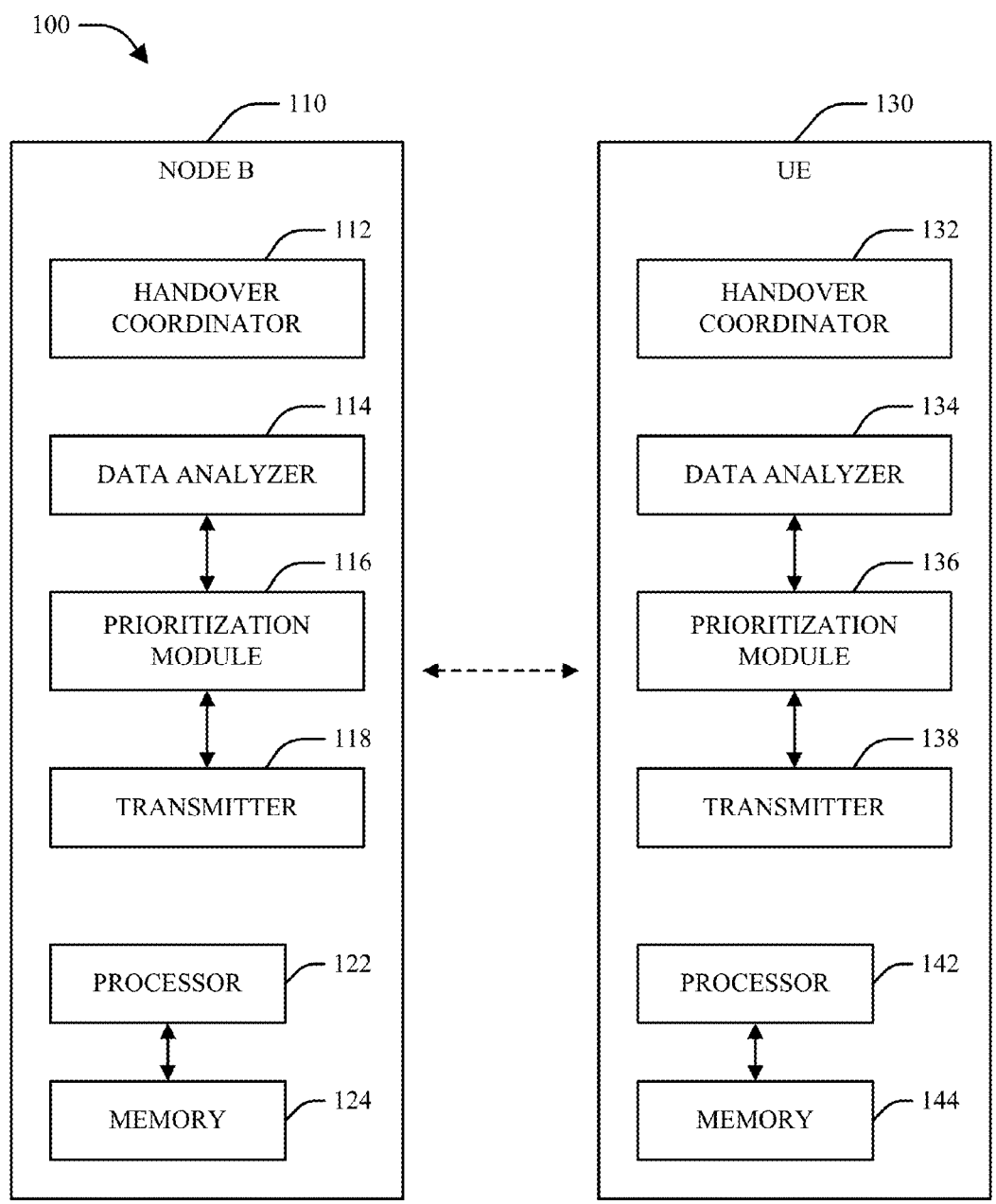
FIG. 1 is a block diagram of a system that facilitates management of data transmissions associated with a handover in a wireless communication system in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates a system 100 that facilitates management of data transmissions associated with a handover in a wireless communication system in accordance with various aspects described herein. As FIG. 1 illustrates, system 100 can include a Node B (e.g., base station, access point (AP), Evolved Node B (eNB), etc.), which can communicate with one or more user equipment units (UEs, also referred to herein as access terminals (ATs), mobile terminals, etc.) 130. In one example, Node B 110 can engage in one or more downlink (DL, also referred to as forward link (FL)) communications with UE 130, and UE 130 can engage in one or more uplink (UL, also referred to as reverse link (RL)) communications with Node B 110. In another example, Node B 110 can be associated with a wireless communication network, such as an Evolved UMTS (Universal Mobile Telecommunications System) Terrestrial Radio Access Network (E-UTRAN), or a portion thereof (e.g., cell, sector, etc.). Further, Node B 110 can operate in conjunction with one or more other network entities, such as a system controller (not shown) or the like, for coordinating communication between Node B 110 and UE 130.

In one example, Node B 110 and UE 130 can communicate data, signaling, and/or other information between each other and/or other entities in system 100 in the form of respective packets, such as Protocol Data Units (PDUs) or the like, that are constructed to contain the respective information. For example, a processor 122 at Node B 110 can, either independently or with the aid of a memory 124, generate one or more packets to be transmitted by a transmitter 118 to ULE 130. Similarly, a processor 142 at UE 130 can be utilized with or without the aid of a memory 144 for generation of packets for transmission via a transmitter 138. In another example, respective memories 124 and 144 at Node B 110 and UE 130 can be utilized to store respective packets or corresponding information before, during, or after respective transmissions.

Figure 2:
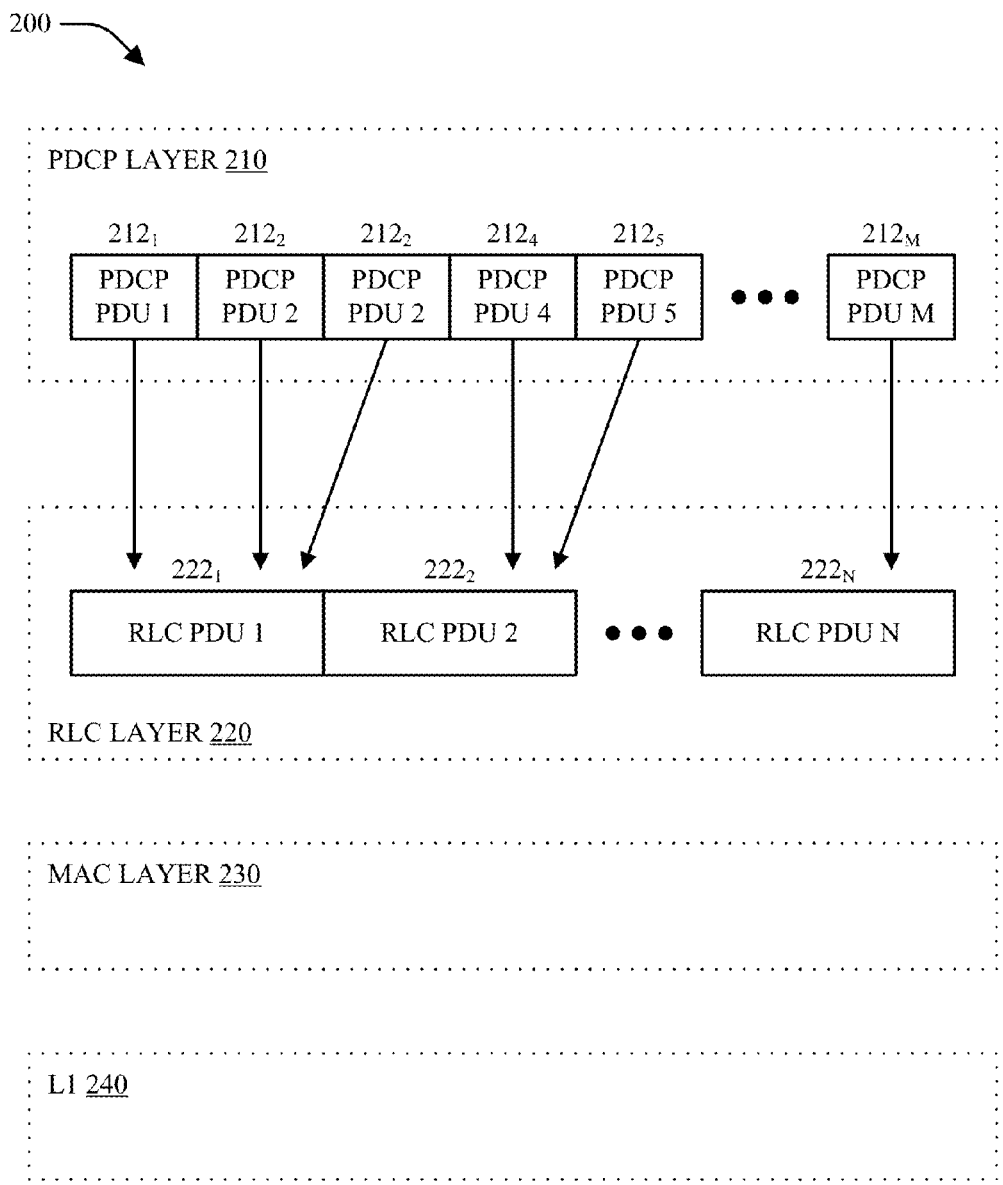
FIG. 2 is a timing diagram that illustrates an example handover sequence that can be conducted in a wireless communication system.

In accordance with one aspect, respective packet transmissions within system 100 can be performed within the context of one or more communication layers in a system protocol stack, as illustrated by diagram 200 in FIG. 2. In the example illustrated by diagram 200, a Packet Data Convergence Protocol (PDCP) layer 210, a Radio Link Control (RLC) layer 220, a Media Access Control (MAC) layer 230, and a Layer 1 (L1) 240 can be utilized to carry out various aspects of a wireless communication at respective levels of complexity. Thus, for example, PDCP layer 210 can be utilized to perform data compression and sequencing and/or other high-level functions, RLC layer 220 can be utilized to manage transmission and/or re-transmission of various data, MAC layer 230 can be utilized to manage access of respective associated devices to communication resources associated with a network, and L1 240 can be utilized at a low level to manage a physical air interface associated with a given network device. It should be appreciated, however, that the above is provided by way of specific example and that any layer 210-240 illustrated by diagram 200 can perform any suitable function(s). Further, it should be appreciated that a system can utilize any suitable set of communication layers in any suitable order.

In accordance with another aspect, layers 210-240 can be associated with respective PDU formats in order to facilitate management and/or processing of information on one or more levels in connection with a communication of the information. Accordingly, as shown in diagram 200, respective PDCP PDUs 212 can be associated with PDCP layer 210, which in turn can be contained within RLC PDUs 222 associated with RLC layer 220. It can be appreciated from diagram 200 that PDCP PDUs 212 can map to RLC PDUs 222 in any suitable manner. Thus, a one-to-one mapping, a many-to-one mapping, a one-to-many mapping, and/or any other suitable mapping can be utilized to encapsulate PDCP PDUs 212 within respective RLC PDUs 222. In addition, while not shown in diagram 200, it should be appreciated that MAC layer 230, L1 240, and/or any other layers associated with a wireless communication system can additionally or alternatively utilize a PDU format for processing information within a given corresponding layer.

Figure 3:
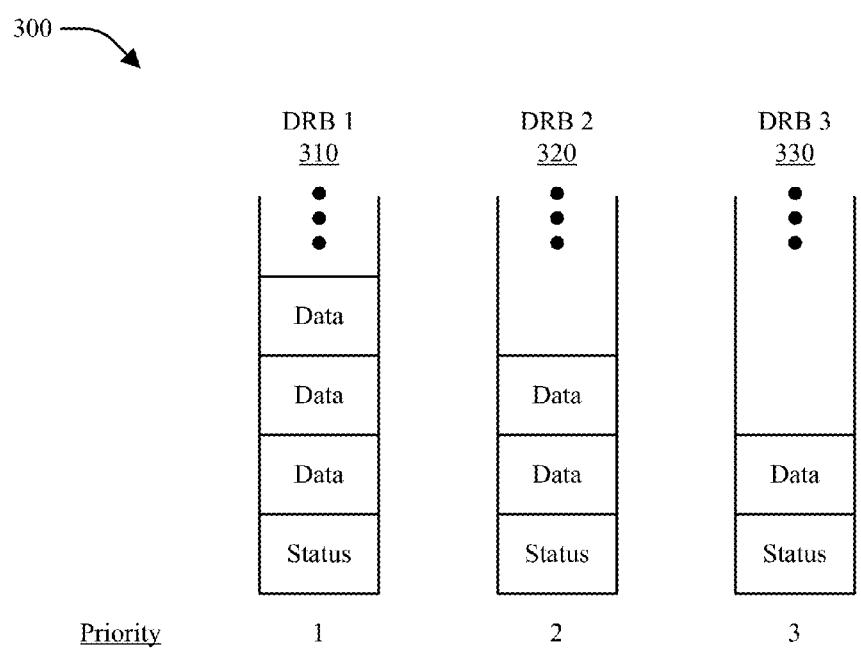
FIG. 3 illustrates example communication layers and respective corresponding packet structures that can be utilized in a wireless communication environment in accordance with various aspects.

In accordance with an additional aspect, a combination of layers within diagram 200, such as PDCP layer 210 and RLC layer 220, can be coupled via respective data radio bearers (DRBs). An example set of DRBs that can be utilized for coupling a set of communication layers is illustrated by diagram 300 in FIG. 3. As diagram 300 illustrates, respective DRBs 310-330 can be provided that correspond to, for example, respective pipelines between PDCP layer 210 and RLC layer 220 as illustrated by diagram 200. While diagram 300 illustrates a system utilizing 3 DRBs 310-330, it should be appreciated that any suitable number of DRBs can be utilized.

In one example, respective DRBs 310-330 can be utilized to queue data corresponding to one or more PDCP PDUs for later transmission within a wireless communication system. Further, DRBs 310-330 can be utilized to hold PDCP status messages, which can be generated and/or used as described in further detail infra. In another example illustrated by diagram 300, DRBs 310-330 can be assigned priority values such that information queued within DRBs 310-330 are transmitted based at least in part on the respective priorities of DRBs 310-330. Thus, as shown in diagram 300, DRB 310 can have a highest priority, DRB 320 can have a second highest priority, and DRB 330 can have a lowest priority. It should be appreciated, however, that priority can be established between DRBs 310-330 in any suitable manner, and that respective given priority level can be applied to any suitable number of DRBs 310-330.

Returning to FIG. 1, system 100 can, in accordance with one aspect, be adaptive in order to optimize communication performance for a given UE 130. Thus, for example, in the event of degraded radio conditions between Node B 110 and UE 130, UE 130 moving outside the coverage area of Node B 110, UE 130 requiring a service that Node B 110 does not have the capability or capacity to provide, or other reasons, a handover can be conducted wherein service for UE 130 is transferred from a source Node B 110 to a target Node B. In one example, a handover coordinator 112 at respective Node Bs 110 and a handover coordinator 132 at UE 130 can be utilized to manage the handover at the respective devices.

Figure 4:
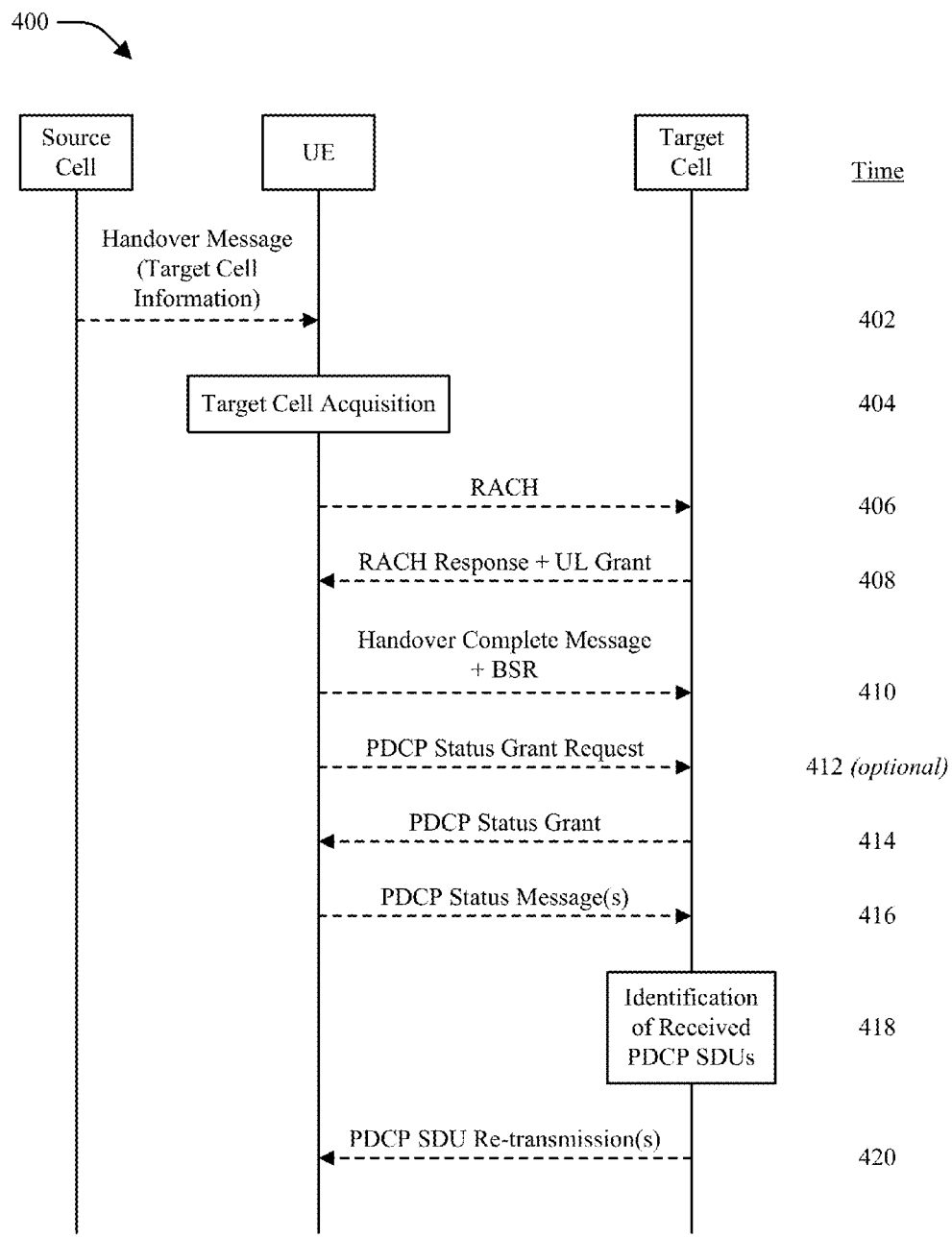
FIG. 4 illustrates example data radio bearers that can be utilized for management of data transmission in a wireless communication environment.

In another example, handover of a UE from a source cell to a target cell can occur as shown in timing diagram 400 illustrated in FIG. 4. While the handover procedure illustrated in FIG. 4 and various aspects provided herein are described with respect to a UE and status reports for DL data, it should nonetheless be appreciated that similar techniques could additionally or alternatively be utilized by a Node B for reporting the status of UL data. The handover can begin as illustrated at time 402, wherein the UE receives a handover message from its source cell that includes information relating to the target cell for the handover. Next, the UE acquires the target cell at time 404 and transmits a Random Access Channel (RACH) message to the target cell at time 406. In one example, the UE can transmit a RACH message at time 406 using a dedicated RACH preamble.

Following receipt of the RACH message, the target cell can transmit a response at time 408 along with a grant of UL resources sufficient for the UE to transmit a handover complete message and a Buffer Status Report (BSR). Based on this grant, the UE can then transmit a handover complete message and BSR at time 410. In one example, in the event that the RACH message was transmitted at time 406 using a dedicated RACH preamble, contention resolution for the RACH message can additionally or alternatively take place at times 408-410. Next, at time 412, the UE can optionally request for a grant for resources on which to transmit one or more PDCP status messages. In one example, the UE can request a grant for one PDCP status message per DRB if configured to do so.

Based on a request transmitted at time 412 and/or on its own initiative, the target cell can subsequently transmit a grant to the UE at time 414 such that the UE can transmit PDCP status message(s). The status message(s) can be transmitted by the UE at time 416. Upon receipt of the message(s), the target cell can identify which PDCP SDUs have been received at time 418 and begin retransmission of PDCP SDUs identified as missing at the UE at time 420. Additionally or alternatively, the target cell can free memory being utilized to store PDCP PDUs identified as correctly received by the UE at time 418 and/or time 420.

In view of the above handover procedure, UE 130 in system 100 can be configured to transmit respective PDCP status messages on respective DRBs as the first packet(s) following a handover complete message. In one example, PDCP status messages can be transmitted over a signaling radio bearer (SRB) and can be utilized to indicate DL PDCP PDUs that are missing and/or the sequence number (SN) of the last in-sequence received DL PDCP PDU. Thus, by way of specific example, in the event that UE 130 receives PDCP PDUs from a Node B 110 on a given DRB with SNs of 1, 2, 4, 6, and 10, a PDCP status message for the DRB can indicate that PDCP PDUs with SNs of 3, 5, 7, 8, and 9 are missing and that the PDCP PDU with a SN of 2 was the last in-sequence received PDU. Accordingly, Node B 110 can free memory utilized for storing PDUs 1, 2, 4, 6, and 10 and conduct re-transmission for only missing PDUs 3, 5, 7, 8, and 9. In a similar specific example, in the event that respective PDCP PDUs are encapsulated into respective RLC PDUs, UE 130 can transmit RLC acknowledgements (ACKs) to Node B 110 corresponding to RLC PDUs correctly received by UE 130. Thus, for example, if a RLC PDU is configured to contain five PDCP PDUs with SNs of 1-5, UE 130 can be configured to submit an ACK for the RLC PDU to Node B 110 upon successful receipt, based on which Node B 110 can free the appropriate memory and refrain from re-transmission of PDCP PDUs 1-5.

In conventional wireless communication implementations, a scheduler algorithm utilized by respective Node Bs and/or UEs is not made aware of status messages (e.g., PDCP status messages, RLC ACKs) being generated after a handover and/or at other suitable times. Instead, it can be appreciated that respective entities in a wireless communication system are configured to transmit data over respective logical channels such that the Prioritize Bit Rate (PBR) of the respective logical channels and/or one or more similar other conditions are met.

Thus, by way of specific example, in the event that Node B 110 provides an assignment to UE 130 to transmit a given amount of information, a token bucket and/or another suitable MAC layer or other structure at UE 130 could prepare a responsive transmission by selecting data from respective DRBs until exhaustion of the DRBs or satisfaction of their respective associated PBR. More particularly, referring back to diagram 300 in FIG. 3, a MAC entity at UE 130 can select data from a highest priority DRB 310 until either DRB 310 is empty or a set amount of data specified by a PBR for DRB 310 to prevent starvation of other DRBs 320-330. Subsequently, the MAC entity can be configured to move to DRB 320 to repeat this process upon satisfaction of the conditions associated with DRB 310.

Accordingly, it can be appreciated that when multiple channels are utilized for transmission, conventional scheduling algorithms can in some cases prevent status messages corresponding to the second or subsequent channels to be transmitted before the PBR of the first channel is met, substantially all data is moved out of the first channel, and/or upon satisfaction of other conditions. This can result in the transmission of status messages can be delayed, which can in turn prevent entities in system 100 from substantially benefiting from the status messages. For example, in the event that a transmitting entity in system 100 does not receive one or more reports (e.g., via PDCP status messages, RLC ACKs, etc.) relating to missing data requested for re-transmission, the transmitting entity can in some cases elect not to conduct re-transmission for a substantial portion of data, which can result in a loss of data in the event that such data is missing and re-transmission is desirable. Alternatively, in the absence of a status report, the transmitting entity can assume that respective portions of data were not received and conduct re-transmission for such portions. However, it can be appreciated that this can result in the transmission of unwanted duplicate data on the uplink and/or downlink in the event that at least a portion of the re-transmitted data was successfully received in the original transmission. Further, it can be appreciated that conducting duplicate transmissions in this manner can additionally lead to inefficient memory usage at the transmitting entity, as the transmitting entity is unable to free memory associated with data associated with the duplicate transmission(s).

Thus, in accordance with one aspect, Node B 110, UE 130, and/or any other suitable entity in system 100 can be configured to intelligently schedule queued information such that status messages are prioritized and transmitted ahead of data. For example, a data analyzer 114 at Node B 110 and/or a data analyzer 134 at UE 130 can be utilized to monitor information associated with respective DRBs or logical channels corresponding to Node B 110 and/or UE 130. Based on information obtained from data analyzer 114 and/or 134, a prioritization module 116 and/or 136 can be made aware of status messages (e.g., PDCP status messages, RLC ACKs, etc.) and prioritize transmission at transmitter 118 and/or 138 such that status messages are transmitted from at least a portion of logical channels before transmitting data or satisfying a PBR associated with the logical channels. Accordingly, an entity receiving the status messages can avoid duplicate transmissions of data and wasted over-the-air bandwidth on the uplink and/or downlink, as generally described above.

In one example, prioritization module 116 and/or 136 can ensure that a sufficiently high priority is given to PDCP status reports after a handover, such that no transmissions or re-transmissions of data are conducted on any logical channels for which a PDCP status report is requested until substantially all of the PDCP status reports have been transmitted. In another example, prioritization module 116 and/or 136 can operate with respect to DRBs having a non-infinite PBR by facilitating transmission of PDCP status messages on respective DRBs before meeting the PBR of any related DRBs. Alternatively, prioritization module 116 and/or 136 can operate with respect to DRBs operating on a strict priority basis (e.g., associated with an infinite PBR) by facilitating transmission of PDCP status messages on respective DRBs before conducting any transmissions of data on the respective DRBs. As another alternative, prioritization module 116 and/or 136 can facilitate the prioritization of status messages on any other suitable logical channel, such as a signaling radio bearer (SRB) or the like.

In a further example, prioritization module 116 and/or 136 can be configured to prioritize RLC status messages (e.g., RLC STATUS messages containing one or more ACKs and/or negative ACKs (NACKs)) in addition to and/or in place of PDCP status messages. Accordingly, during a communication session between Node B 110 and UE 130 and/or at any other appropriate time, data analyzer 114 and/or 134 or prioritization module 116 and/or 136 can be made aware of the existence of respective RLC status messages and/or their respective types (e.g., whether the messages contain NACK information) in order to prioritize the RLC status messages over new transmissions and/or re-transmissions of data on other logical channels. Accordingly, it can be appreciated that an entity receiving the RLC status messages can be made aware of negative acknowledgements as soon as possible during the course of a communication session, thereby ensuring the smooth flow of data on a given channel. Additionally, by prioritizing RLC status messages in this manner, it can be appreciated that the re-transmission of unwanted data, such as data originally transmitted but not acknowledged at a receiving entity due to a status prohibit timer, an insufficient UL/DL grant, and/or other factors, can be substantially avoided.

In accordance with another aspect, data analyzer 114 and prioritization module 116 at Node B 110 and/or data analyzer 134 and prioritization module 136 at UE 130 can be configured to prioritize status messages associated with a limited subset of applications. Accordingly, by way of example, real-time applications (e.g., Voice Over Internet Protocol (VOIP) applications or the like) and/or other time-sensitive or other applications can be exempt from prioritization. For example, upon establishing a communication session for a given application, Node B 110 and/or UE 130 can determine whether the application is time-sensitive, and upon a positive determination can disable some or all prioritization as described above with respect to the application.

With respect to the following FIGS. 5-9, specific examples of implementations that can be utilized for managing status messages in a wireless communication system are illustrated. It should be appreciated, however, that the examples are merely illustrative in nature and that, unless explicitly stated otherwise, the hereto appended claims are not intended to be limited to such implementations.

Figure 5:
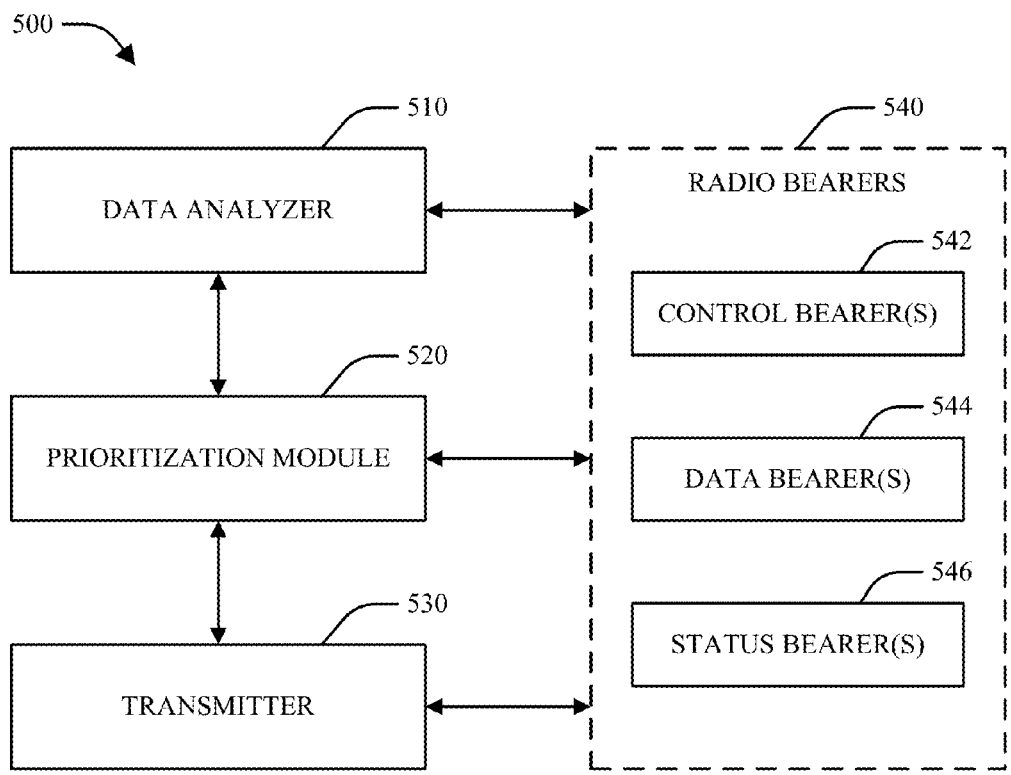
FIG. 5 is a block diagram of a system for prioritizing status messages associated with a wireless communication system via one or more status bearers in accordance with various aspects.

Turning now to FIG. 5, a block diagram of a system 500 for prioritizing status messages associated with a wireless communication system via one or more status bearers 546 is illustrated in accordance with various aspects. In one example, system 500 can include a data analyzer 510, a prioritization module 520, and a transmitter 530, which can interact with a set of radio bearers 540 in a similar manner to that described above with respect to Node B 110 and/or UE 130 in system 100. As further illustrated by system 500, radio bearers 540 can include respective control or signaling bearers 542 and respective data bearers 544. In one example, control bearer(s) 542 can be utilized to carry configuration commands and/or other control signaling between one or more users and an associated network, and data bearer(s) 544 can be utilized to facilitate respective transmissions of data.

In accordance with one aspect, system 500 can facilitate the prioritization of status messages over related data messages by further utilizing one or more status bearers 546. For example, status bearer(s) 546 can include one or more queues that are managed by data analyzer 510 and/or prioritization module 520 such that they are dedicated specifically to status information. Accordingly, by granting status bearer(s) 546 a higher degree of priority than at least a portion of data bearer(s) 544, system 500 can facilitate the transmission of status information before any transmissions of data are conducted. Further, the priority level given to respective status bearer(s) 546 can be higher than, equal to, or lower than respective control bearer(s) 542.

Figure 6:
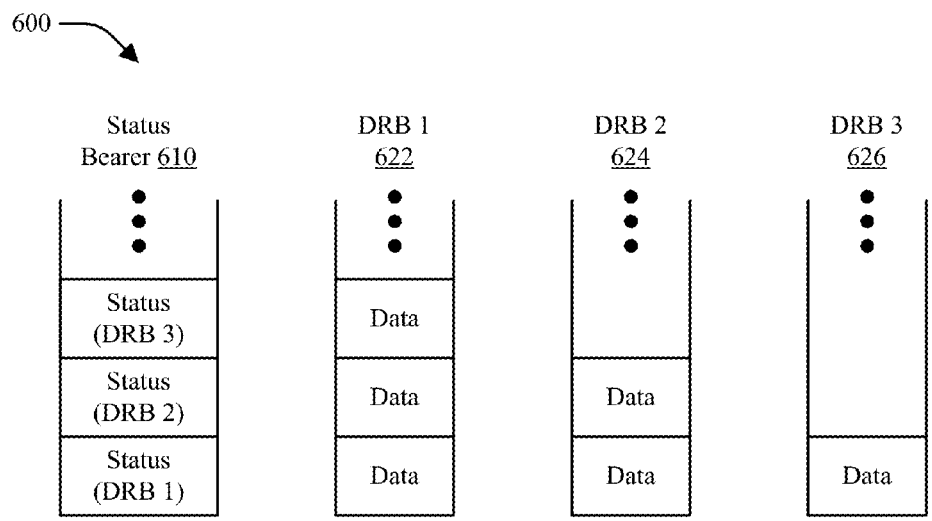
FIGS. 6-7 illustrate respective example techniques for implementing one or more status bearers in combination with a set of data radio bearers in accordance with various aspects.
Figure 7:
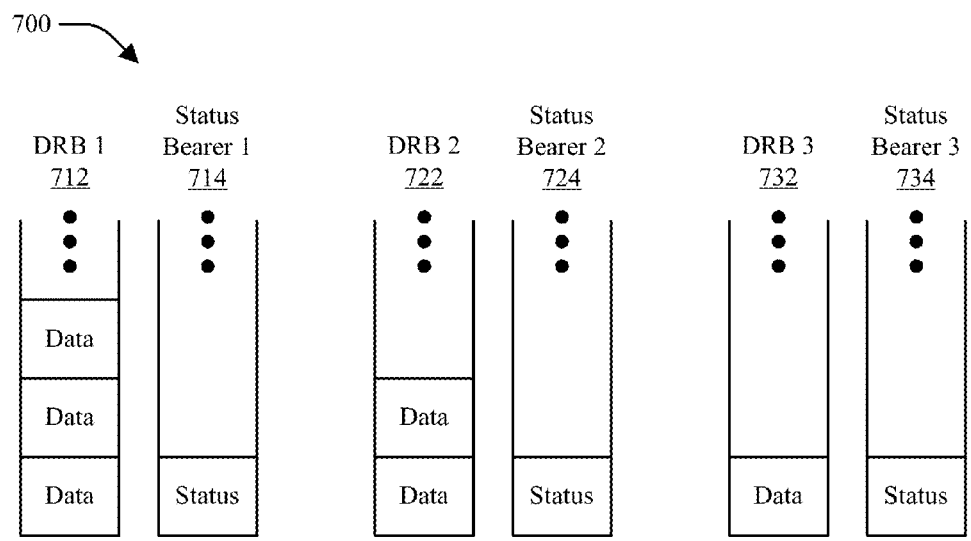

Respective example techniques by which status bearer(s) 546 can be implemented are illustrated by diagrams 600-700 in FIGS. 6-7. Referring first to diagram 600 in FIG. 6, an implementation is illustrated in which a single status bearer 610 is utilized in connection with a set of multiple DRBs 622-626. In accordance with one aspect as shown in diagram 600, status messages corresponding to respective DRBs 622-626 and/or other messages to be prioritized can be identified and placed into a dedicated status bearer 610. In one example, status bearer 610 can be implemented as a control bearer, a high priority data bearer, or the like such that a scheduler considers messages in the status bearer 610 to be of a higher priority than messages in DRBs 622-626. Based on this priority determination, a scheduler can drain status bearer 610 prior to removing data from DRBs 622-626 upon receiving a grant for transmission.

As additionally illustrated by diagram 600, to facilitate the use of a common status bearer 610 corresponding to multiple DRBs 622-626, status messages placed into status bearer 610 can be configured with respective indicators of the DRBs 622-626 to which they refer. By utilizing such indicators, it can be appreciated that an entity receiving a status message from status bearer 610 can be enabled to determine a DRB to which the status message refers without requiring the status message to be queued at the relevant DRB.

In another example, status messages can be queued using status bearer 610 in an order corresponding to the relative priorities of the DRBs 622-626 to which the status messages respectively refer. Thus, for example, a status message corresponding to DRBs 622-626 can be placed in status bearer 610 in descending order of priority beginning with a highest priority DRB.

Referring next to diagram 700 in FIG. 7, an alternative implementation is illustrated in which multiple status bearers 714, 724, and/or 734 are utilized corresponding to respective DRBs 712, 722, and/or 732. As shown in diagram 700, respective status bearers 714, 724, and 734 can be configured to correspond to respective DRBs 712, 722, and 732, such that status messages and/or other messages to be prioritized that are associated with a given DRB 712, 722, or 732 can be identified and placed in the status bearer 714, 724, or 734 that corresponds to the DRB. Subsequently, a high priority level can be assigned to status bearers 714, 724, and 734 in a similar manner to that described above with respect to FIG. 6 such that status bearers 714, 724, and/or 734 are drained prior to removing data from DRBs 712, 722, and/or 732 upon receiving a grant for transmission.

Figure 8:
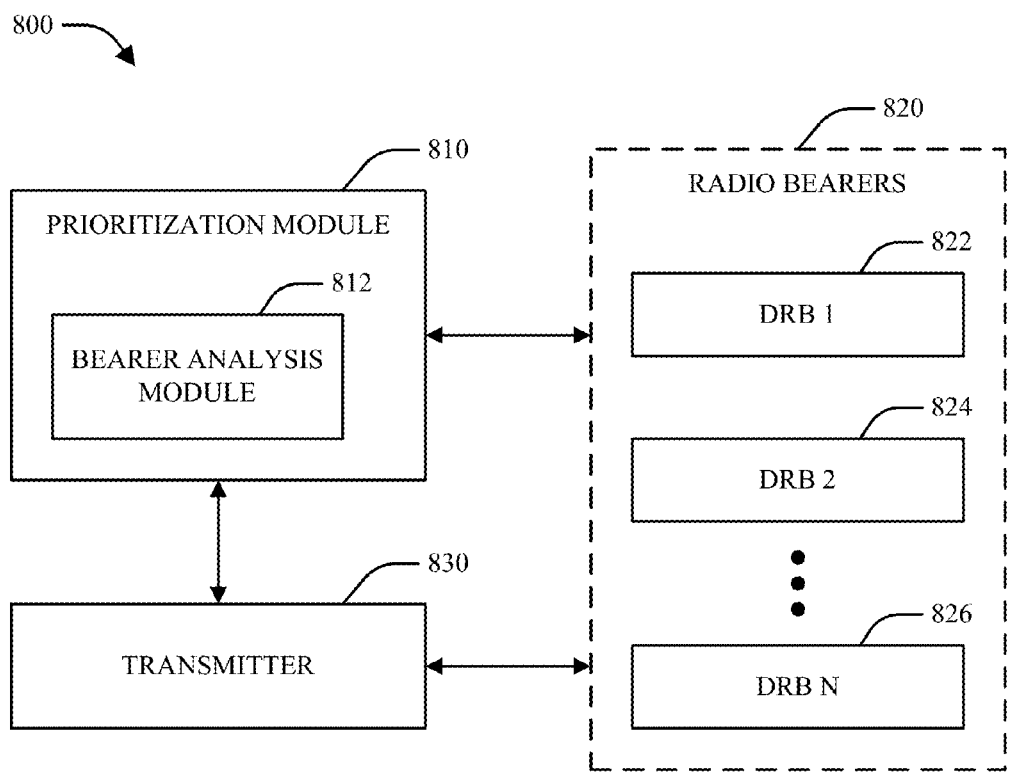
FIG. 8 is a block diagram of a system for prioritization of status messages based on analysis of respective associated radio bearers in accordance with various aspects.

Turning to FIG. 8, a block diagram is provided that illustrates a system 800 for prioritization of status messages based on analysis of respective associated radio bearers 820 in accordance with various aspects. As FIG. 8 illustrates, a prioritization module 810 can be utilized to prioritize status messages, data, and/or other information associated with a set of radio bearers 820, which can include DRBs 822-826. Based on priority levels assigned to respective information by prioritization module 810, a transmitter 830 can be utilized to transmit information according to the assigned priority levels in accordance with various aspects as generally described above. In accordance with one aspect as shown in system 800, prioritization module 810 can include a bearer analysis module 812, which can examine respective DRBs 822-826 to identify whether said DRBs 822-826 contain status information. Upon identifying status information, prioritization module 810 and/or bearer analysis module 812 can facilitate transmission of the status information ahead of other data as generally described herein.

Following a handover, it can be appreciated that a UE and/or network entity can be configured to transmit PDCP status messages and/or other suitable status information over a set of DRBs as the first packet following a handover complete message. Accordingly, to facilitate such transmission, PDCP status messages can be positioned as the first element of each DRB for which status is to be transmitted. An example of this positioning can be seen with respect to DRBs 310-330 in FIG. 3. Based on this positioning, bearer analysis module 812 can, in one example, be configured to check the first element of respective associated DRBs 822-826 in order to determine whether status is present at the respective DRBs 822-826.

In another example, respective status messages utilized by system 800 can be configured to include an indicator that distinguishes the status messages from other data, and bearer analysis module 812 can check respective elements of DRBs 822-826 for the indicator to determine whether a given element comprises status or data. By way of example, a bit at a predefined bit position within an element (e.g., a first position) can be configured to a first value if the element comprises status or a second value if the element comprises other data. Thus, bearer analysis module 812 can be configured to read one or more elements in respective DRBs 822-826 at the predefined bit position in order to facilitate prioritization of the respective elements.

Figure 9:
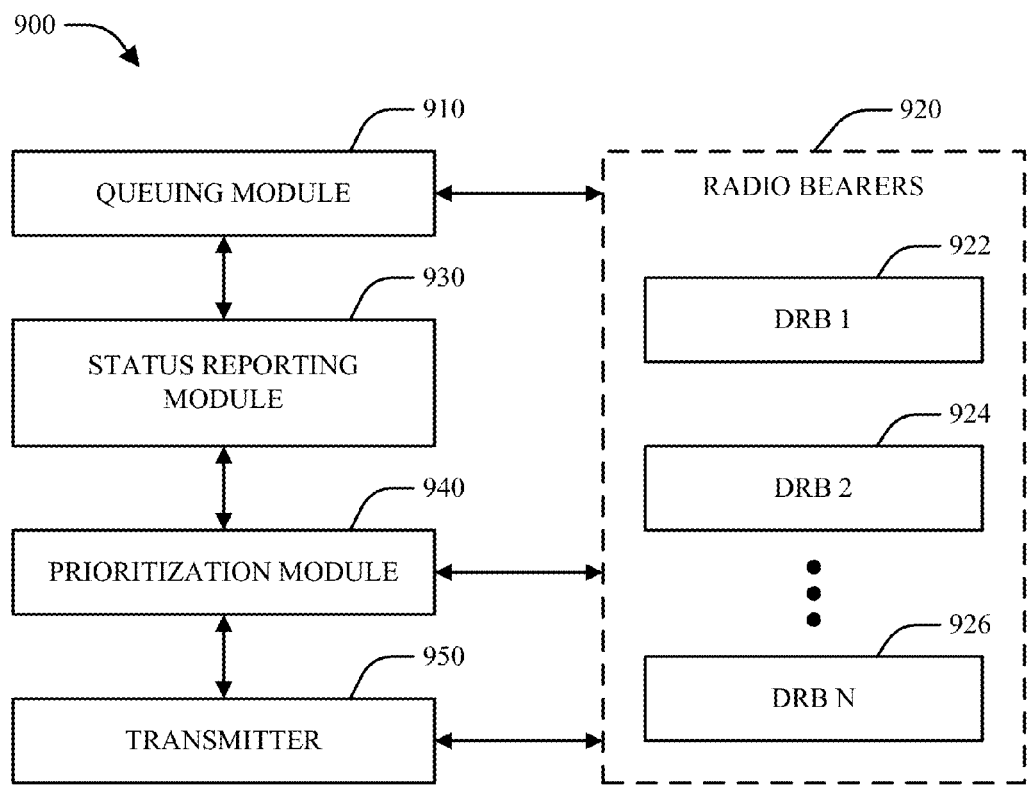
FIG. 9 is a block diagram of a system for prioritization of status messages based on recorded information relating to respective associated radio bearers in accordance with various aspects.

Referring next to FIG. 9, a block diagram of a system 900 for prioritization of status messages based on recorded information relating to respective associated radio bearers 920 is illustrated. As FIG. 9 illustrates, system 900 can include a queuing module 910, which can be utilized by a UE, a network, and/or any other suitable entity to queue data, status messages, and/or other information within a set of radio bearers 920 that can include respective DRBs 922-926. In one example, in the event that queuing module 910 places status information into respective given DRBs 922-926, the existence of status information on the DRB(s) 922-926 can be reported to a prioritization module 940 by a status reporting module 930. Accordingly, based on reports provided by status reporting module 930, prioritization module 940 can determine respective DRBs 922-926 that contain status information and facilitate transmission of the status information by a transmitter 950 prior to transmission of other data.

In accordance with one aspect, status reporting module 930 can be implemented in any manner suitable to provide a record of respective DRBs 922-926 that contain status information. As a specific example, status reporting module 930 can be implemented as a PDCP-layer entity which reports the existence of PDCP status messages to a prioritization module 940 that is implemented as a RLC-layer entity.

Further, it can be appreciated that status reporting module 930 can indicate the existence of status information on respective DRBs 922-926 in various manners. For example, status reporting module 930 can maintain a set of variables respectively corresponding to DRBs 922-926, and prioritization module 940 can check the respective variables to identify DRBs 922-926 containing status information. Additionally or alternatively, status reporting module 930 and prioritization module 940 can maintain a list of DRBs containing status information. For example, upon queuing status information at a given DRB 922-926, status reporting module 930 can update the list to add the DRB at which the status information was queued. Subsequently, upon transmission of the status information at the DRB, prioritization module 940 can facilitate removal of the DRB from the list. In another example, in the event that status reporting module 930 indicates no DRBs 922-926 contain status information, prioritization module 940 can coordinate transmission of data from one or more DRBs 922-926 utilizing one or more techniques as described herein and/or generally known in the art.

Referring now to FIGS. 10-14, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 10:
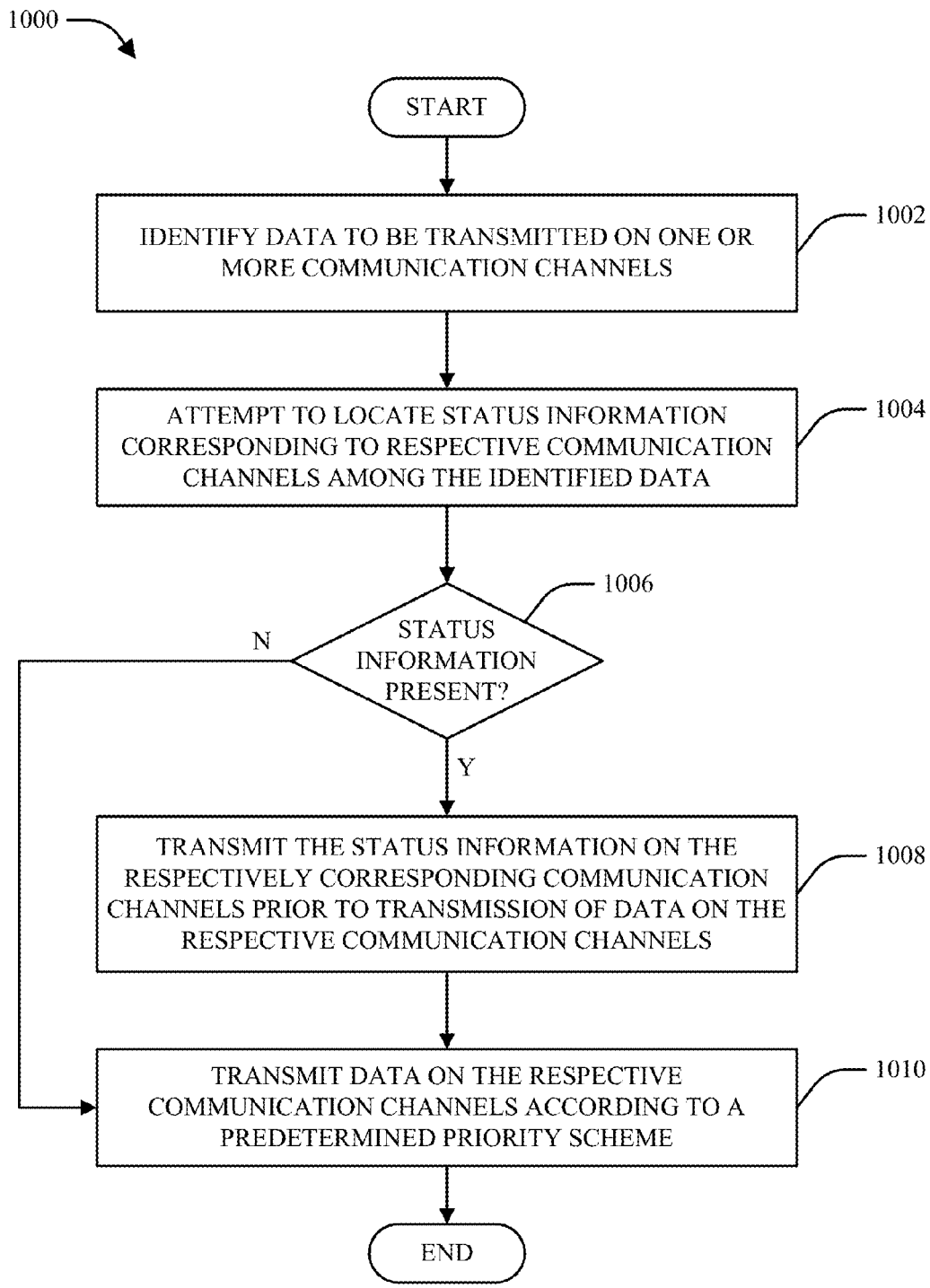
FIG. 10 is a flow diagram of a methodology for managing transmission of status information in a wireless communication system.

With reference to FIG. 10, illustrated is a methodology 1000 for managing transmission of status information in a wireless communication system. It is to be appreciated that methodology 1000 can be performed by, for example, an eNB (e.g., Node B 110), a UE (e.g., UE 130), and/or any other appropriate network device. Methodology 1000 begins at block 1002, wherein data to be transmitted on one or more communication channels (e.g., in connection with a handover coordinated by a handover coordinator 112 or 132) is identified. Next, at block 1004, an entity performing methodology 1000 can attempt to locate status information corresponding to respective communication channels among the identified data (e.g., using a data analyzer 114 or 134).

At block 1006, a determination can be made (e.g., by data analyzer 114 or 134 and/or a prioritization module 116 or 136) whether the attempt to locate status information (e.g., RLC STATUS messages indicating ACK/NACK information, PDCP status messages, etc.) at block 1004 resulted in the location of status information present in the identified data. If status information is found to be present in the data, methodology 1000 can proceed to block 1008, wherein the located status information is transmitted (e.g., by a transmitter 118 or 138) on respective communication channels corresponding to the status information prior to transmission of data on the respective communication channels (e.g., as controlled by prioritization module 116 or 136). Upon completing the acts described at block 1008, or upon a negative determination at block 1006, methodology 1000 can conclude at block 1010, wherein data is transmitted on respectively corresponding communication channels according to a predetermined priority scheme (e.g., PBR-defined priority, strict priority, etc.).

Figure 11:
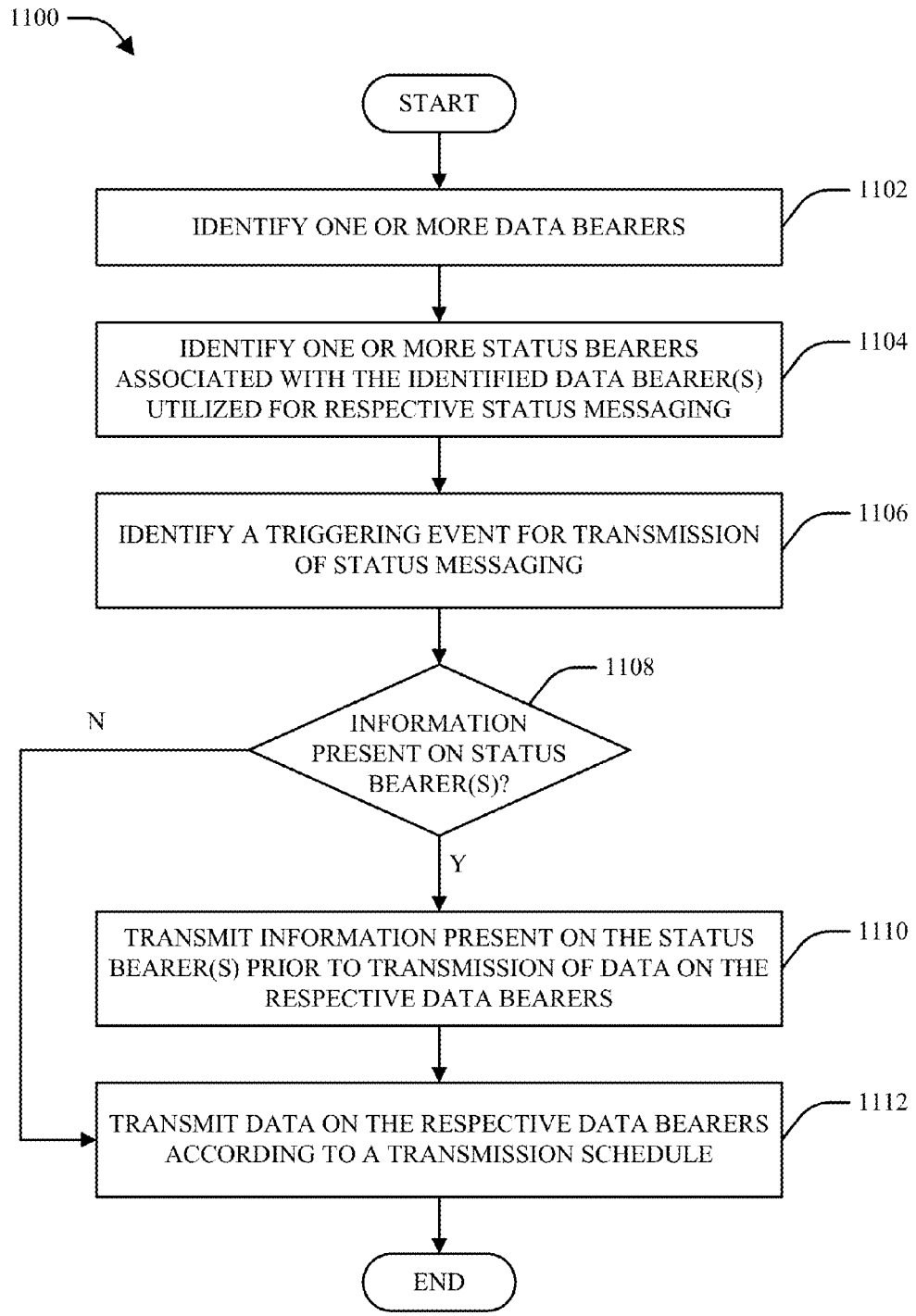
FIG. 11 is a flow diagram of a methodology for maintaining and utilizing one or more radio bearers for status signaling.

FIG. 11 illustrates a methodology 1100 for maintaining and utilizing one or more radio bearers for status signaling (e.g., status bearers 546) in a wireless communication environment. Methodology 1100 can be performed by, for example, a base station, a terminal, and/or any other suitable network device. Methodology 1100 begins at block 1102, wherein one or more data bearers (e.g., data bearers 544) are identified. Next, at block 1104, one or more status bearers that are utilized for respective status messaging in association with the data bearers identified at block 1102 are identified. In one example, status bearers identified at block 1104 can be common to a set of data bearers (e.g., as shown in diagram 600), allocated for one or more individual data bearers (e.g., as shown in diagram 700), and/or configured in any other appropriate manner.

Upon identification of the respective data and status bearers at blocks 1102-1104, methodology 1100 can proceed to block 1106, wherein a triggering event for transmission of status messaging (e.g., a RLC STATUS trigger associated with a voice call and/or another suitable type of communication session, a PDCP status trigger associated with a handoff, etc.) is identified. Methodology 1106 can then proceed to block 1108, wherein it is determined (e.g., by a data analyzer 510) whether information is present on the status bearer(s) identified at block 1104. If such information is found to be present, methodology 1100 can proceed to block 1110, wherein the information present on the status bearer(s) is transmitted (e.g., by a transmitter 530) prior to transmission of data on the respective data bearers (e.g., as controlled by prioritization module 520). Upon completing the transmission described at block 1110, or upon a negative determination at block 1108, methodology 1100 can conclude at block 1112, wherein data on the respective data bearers identified at block 1102 is transmitted according to a transmission schedule.

Figure 12:
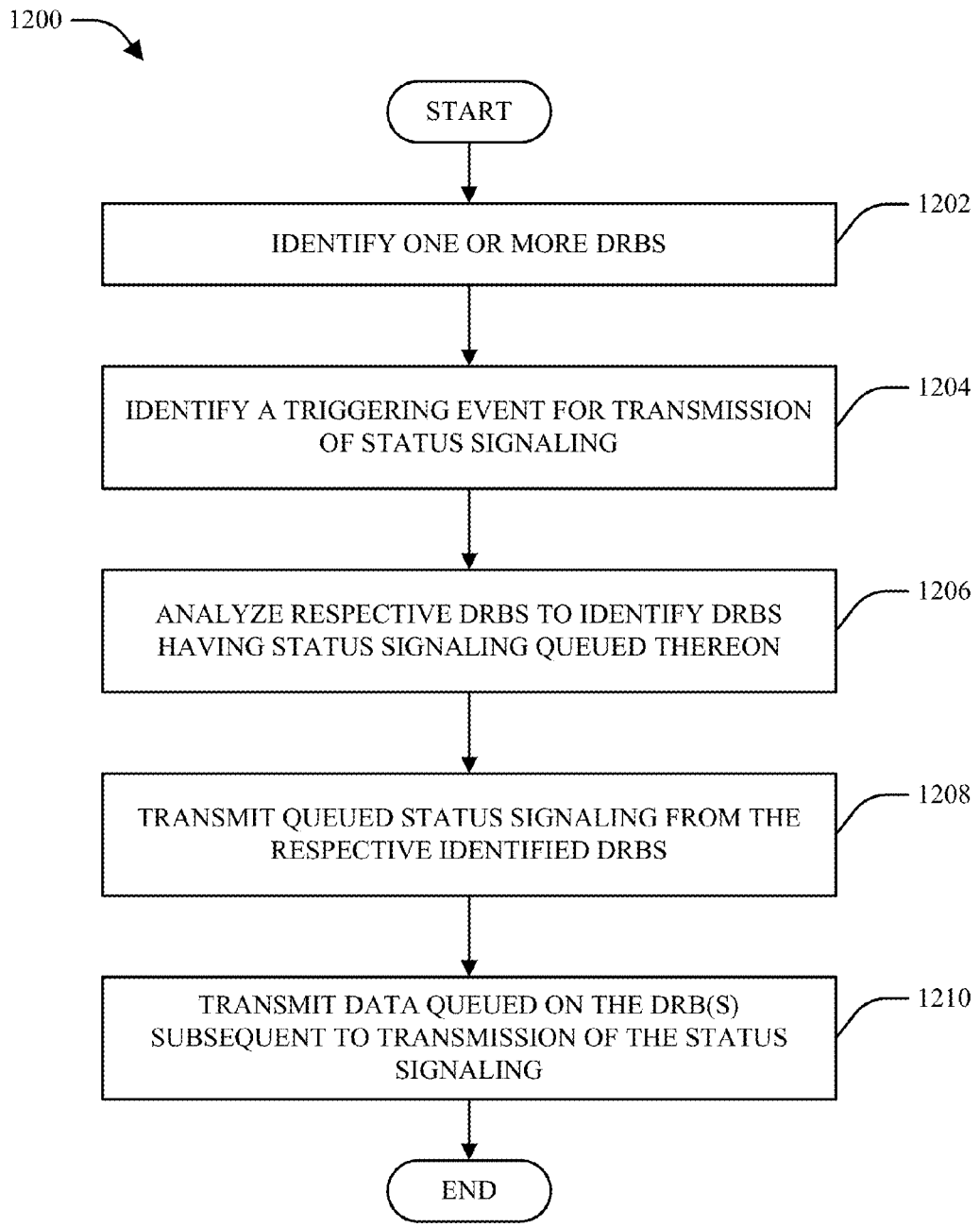
FIG. 12 is a flow diagram of a methodology for analyzing respective data bearers to distinguish and prioritize status information queued on the respective data bearers.

Turning to FIG. 12, a methodology 1200 for analyzing respective data bearers (e.g., DRBs 822-826) to distinguish and prioritize status information queued on the respective data bearers is illustrated. It is to be appreciated that methodology 1200 can be performed by, for example, an access point, a mobile terminal, and/or any other appropriate network device. Methodology 1200 begins at block 1202, wherein one or more DRBs are identified. Next, at block 1204, a triggering event for transmission of status signaling is identified. Methodology 1200 can then proceed to block 1206, wherein respective DRBs identified at block 1202 are analyzed (e.g., by a bearer analysis module 812 associated with a prioritization module 810) to identify DRBs having status signaling queued thereon. By way of specific example, the analysis described at block 1206 can be performed by monitoring information at respective positions within a given DRB at one or more predefined bit positions (e.g., the first bit position within the first message on the DRB) that distinguish data from status signaling. Subsequently, methodology 1200 can proceed to block 1208, wherein queued status signaling is transmitted (e.g., using a transmitter 830) from the respective DRBs identified at block 1206 as including status signaling. Methodology 1200 can then conclude at block 1210, wherein data queued on the DRBs identified at block 1202 are transmitted subsequent to the status transmission performed at block 1208.

Figure 13:
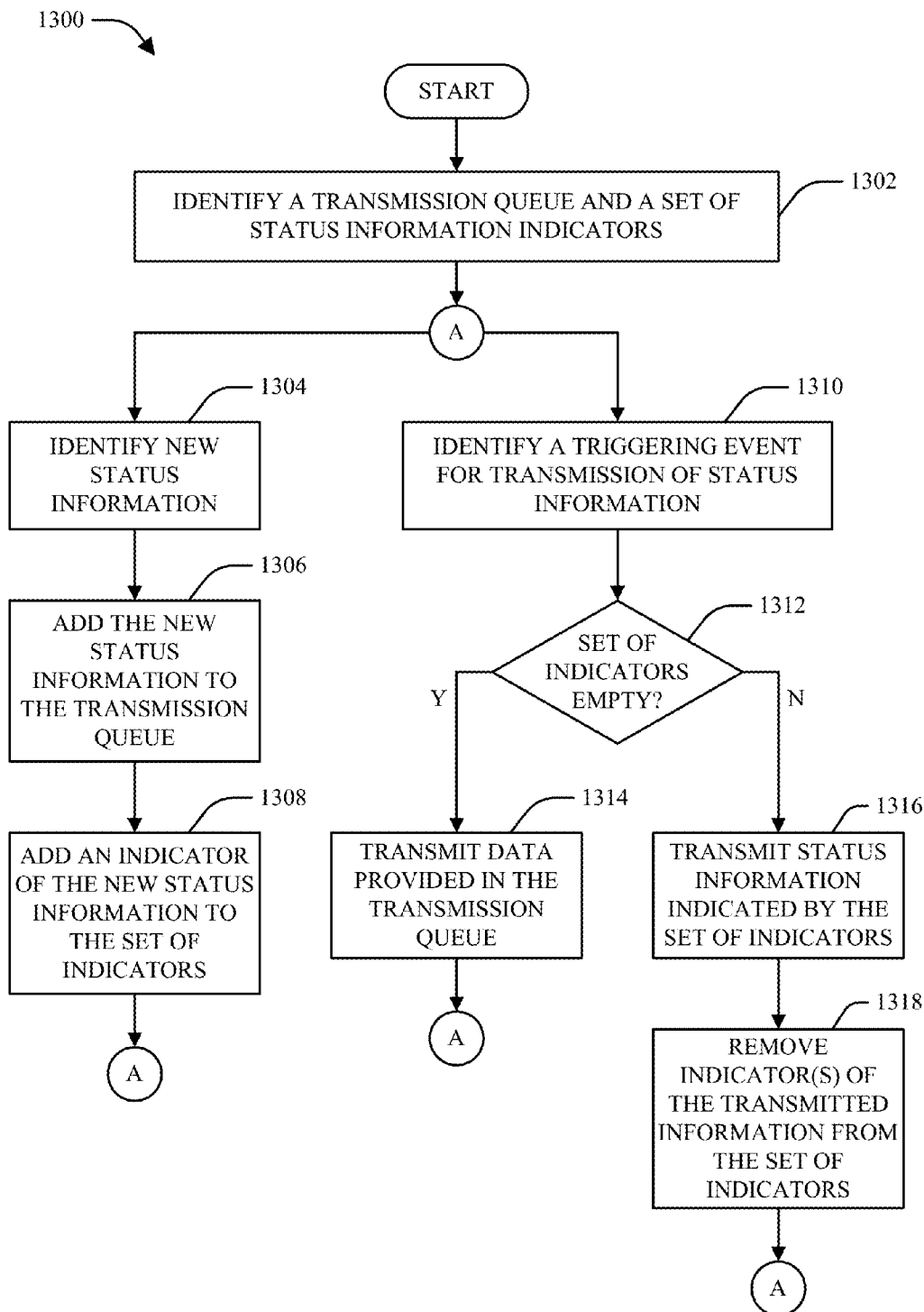
FIG. 13 is a flow diagram of a methodology for tracking status information among a set of radio bearers for prioritized transmission.

Referring next to FIG. 13, a flow diagram of a methodology 1300 for tracking status information among a set of radio bearers for prioritized transmission is illustrated. It can be appreciated that methodology 1300 can be performed by an eNB, a UE, and/or any other appropriate entity in a wireless communication system. Methodology 1300 begins at block 1302, wherein a transmission queue (e.g., corresponding to radio bearers 920) and a set of status information indicators (e.g., as maintained by a status reporting module 930 and/or a prioritization module 940) is identified.

Following performance of the acts described at block 1302, methodology 1300 can branch at connector A to block 1304 or block 1310. Thus, at block 1304, new status information can be identified, and the identified status information can be added to the transmission queue (e.g., by a queuing module 910) at block 1306. Subsequently, at block 1308, an indicator of the identified status information is added to the set of indicators identified at block 1302. Upon completion of the acts described at block 1308, methodology 1300 can return to connector A for branching to block 1304 or block 1310.

At block 1310, a triggering event for transmission of status information is identified. Subsequently, at block 1312, it is determined whether the set of status information indicators identified at block 1302 is empty. If the indicator set is empty, methodology 1300 can proceed to block 1314, wherein data provided in the transmission queue identified at block 1302 is transmitted. Following the acts described at block 1314, methodology 1300 can return to connector A. Alternatively, upon determining at block 1312 that the indicator set is not empty, methodology 1300 can instead proceed to block 1316, wherein at least a portion of the status information indicated by the set of status information indicators is transmitted, and to block 1318, wherein the indicators corresponding to the status information transmitted at block 1316 are removed from the indicator set. Following completion of the acts described at blocks 1316-1318, methodology 1300 can return to connector A.

Figure 14:
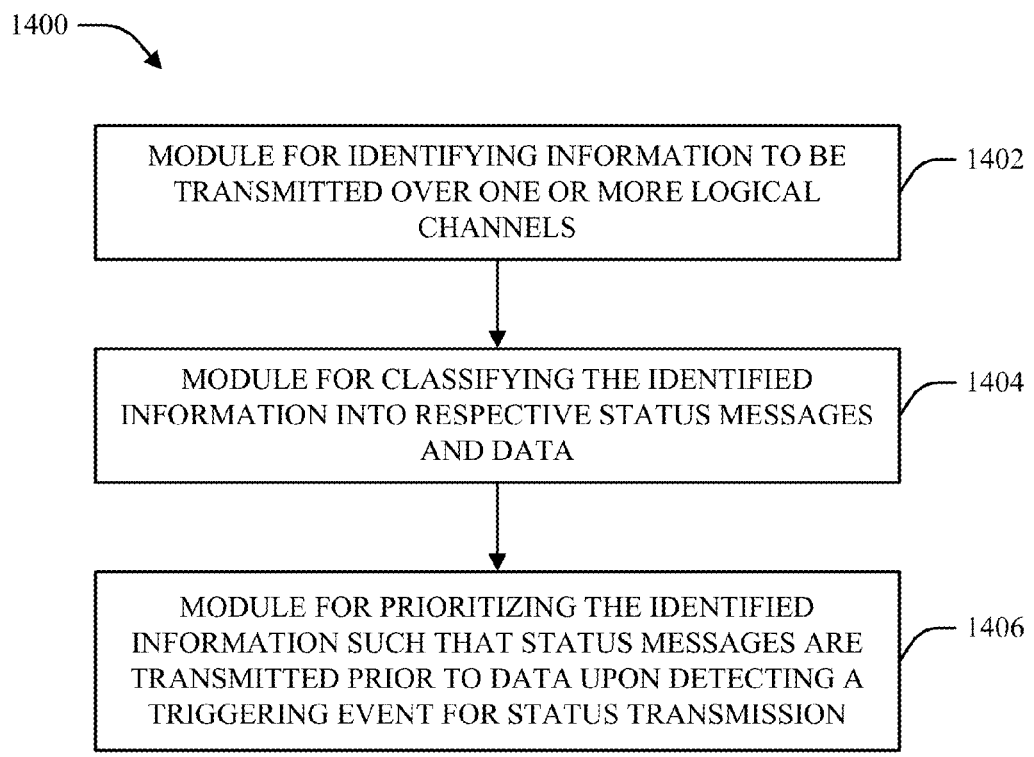
FIG. 14 is a block diagram of an apparatus that facilitates transmission of status signaling in a wireless communication system.

FIG. 14 illustrates an apparatus 1400 that facilitates transmission of status signaling in a wireless communication system. It is to be appreciated that apparatus 1400 is represented as including functional blocks, which can be functional blocks that represent functions implemented by a processor, software, or combination thereof (e.g., firmware). Apparatus 1400 can be implemented by a Node B (e.g., Node B 110), a wireless terminal (e.g., UE 130), and/or any other suitable network device and can include a module 1402 for identifying information to be transmitted over one or more logical channels, a module 1404 for classifying the identified information into respective status messages and data, and a module 1406 for prioritizing the identified information such that status messages are transmitted prior to data upon detecting a triggering event for status transmission.

Figure 15:
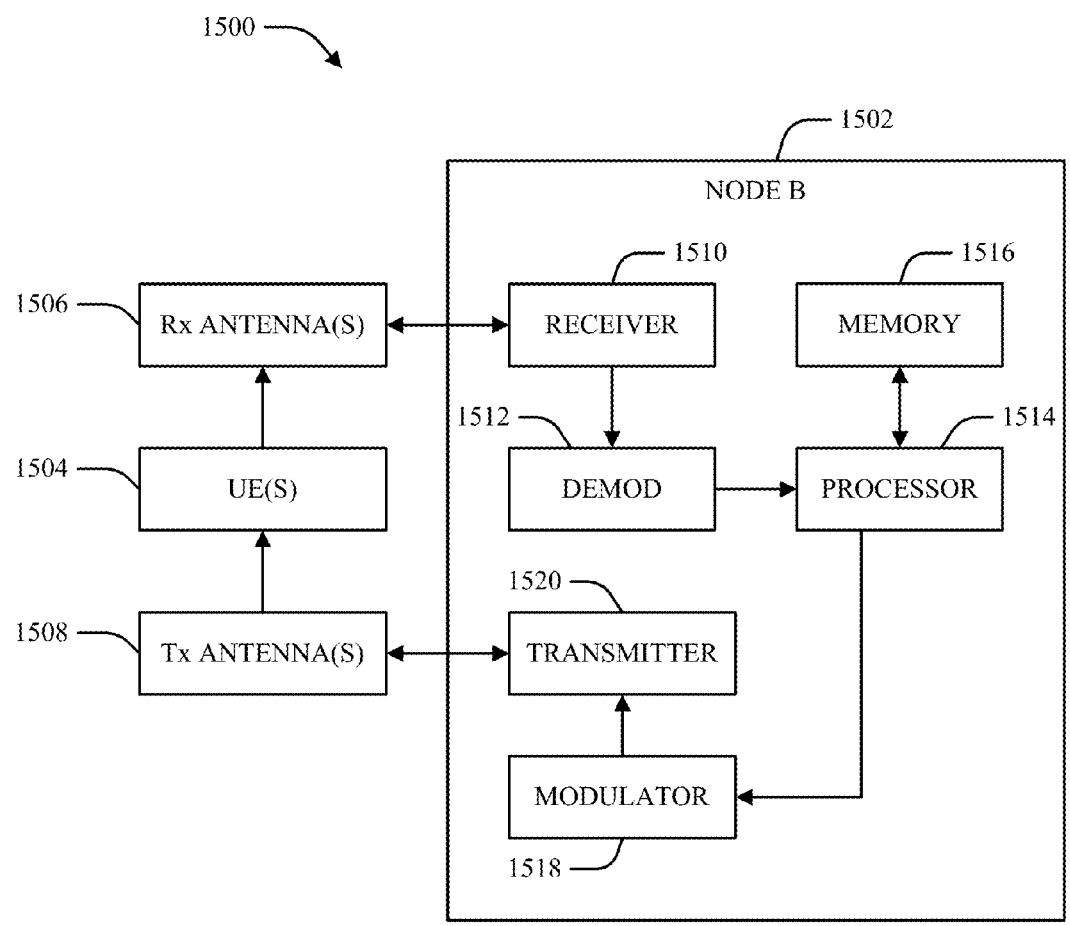
FIGS. 15-16 are block diagrams of respective wireless communication devices that can be utilized to implement various aspects of the functionality described herein.

FIG. 15 is a block diagram of a system 1500 that can be utilized to implement various aspects of the functionality described herein. In one example, system 1500 includes a base station or Node B 1502. As illustrated, Node B 1502 can receive signal(s) from one or more UEs 1504 via one or more receive (Rx) antennas 1506 and transmit to the one or more UEs 1504 via one or more transmit (Tx) antennas 1508. Additionally, Node B 1502 can comprise a receiver 1510 that receives information from receive antenna(s) 1506. In one example, the receiver 1510 can be operatively associated with a demodulator (Demod) 1512 that demodulates received information. Demodulated symbols can then be analyzed by a processor 1514. Processor 1514 can be coupled to memory 1516, which can store information related to code clusters, access terminal assignments, lookup tables related thereto, unique scrambling sequences, and/or other suitable types of information. Additionally, Node B 1502 can employ processor 1514 to perform methodologies 1000-1300 and/or other similar and appropriate methodologies. In one example, Node B 1502 can also include a modulator 1518 that can multiplex a signal for transmission by a transmitter 1520 through transmit antenna(s) 1508.

Figure 16:
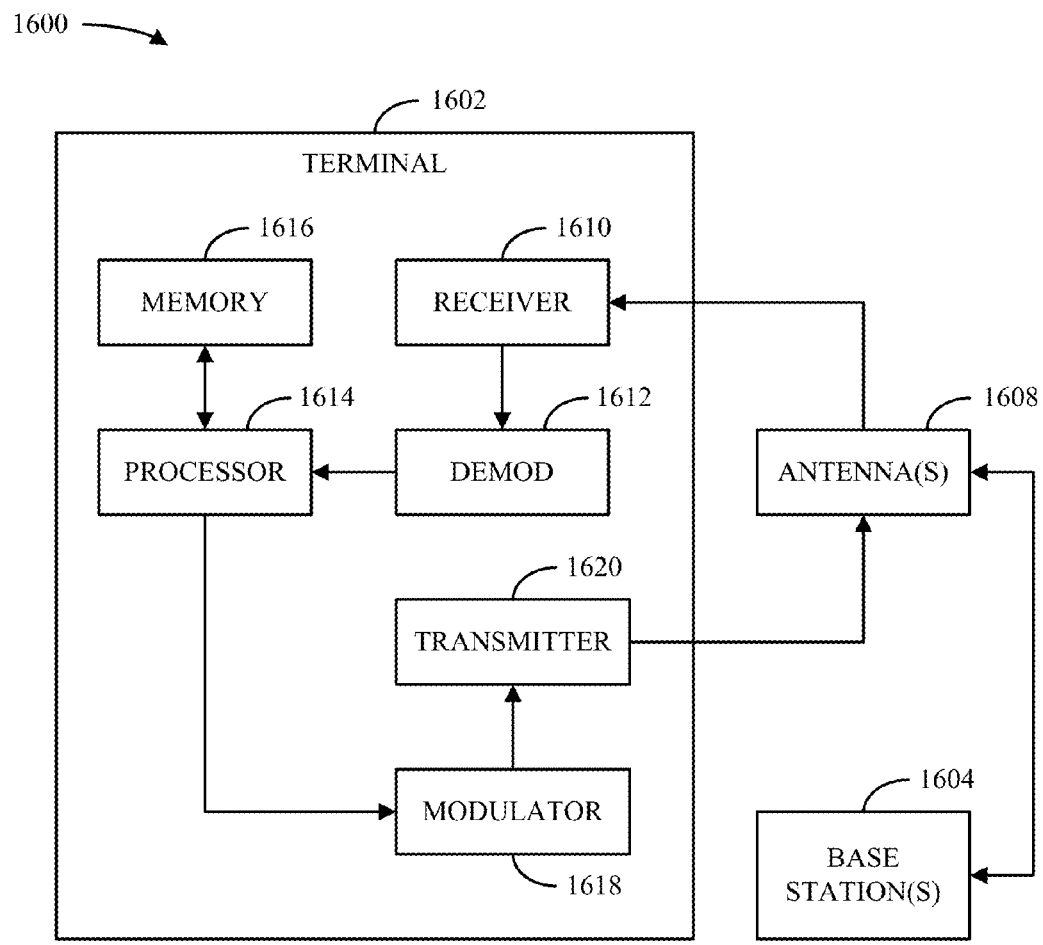

FIG. 16 is a block diagram of another system 1600 that can be utilized to implement various aspects of the functionality described herein. In one example, system 1600 includes a mobile terminal 1602. As illustrated, mobile terminal 1602 can receive signal(s) from one or more base stations 1604 and transmit to the one or more base stations 1604 via one or more antennas 1608. Additionally, mobile terminal 1602 can comprise a receiver 1610 that receives information from antenna(s) 1608. In one example, receiver 1610 can be operatively associated with a demodulator (Demod) 1612 that demodulates received information. Demodulated symbols can then be analyzed by a processor 1614. Processor 1614 can be coupled to memory 1616, which can store data and/or program codes related to mobile terminal 1602. Additionally, mobile terminal 1602 can employ processor 1614 to perform methodologies 1000-1300 and/or other similar and appropriate methodologies. Mobile terminal 1602 can also include a modulator 1618 that can multiplex a signal for transmission by a transmitter 1620 through antenna(s) 1608.

Figure 17:
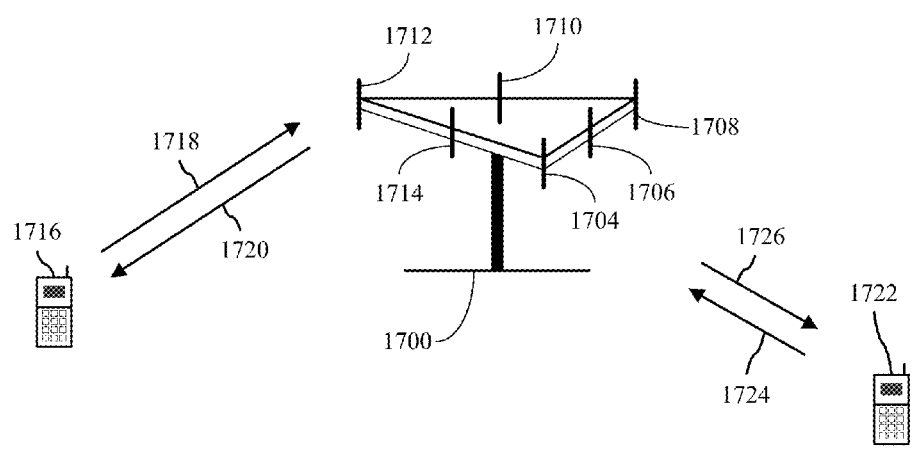
FIG. 17 illustrates a wireless multiple-access communication system in accordance with various aspects set forth herein.

Referring now to FIG. 17, an illustration of a wireless multiple-access communication system is provided in accordance with various aspects. In one example, an access point 1700 (AP) includes multiple antenna groups. As illustrated in FIG. 17, one antenna group can include antennas 1704 and 1706, another can include antennas 1708 and 1710, and another can include antennas 1712 and 1714. While only two antennas are shown in FIG. 17 for each antenna group, it should be appreciated that more or fewer antennas may be utilized for each antenna group. In another example, an access terminal 1716 can be in communication with antennas 1712 and 1714, where antennas 1712 and 1714 transmit information to access terminal 1716 over forward link 1720 and receive information from access terminal 1716 over reverse link 1718. Additionally and/or alternatively, access terminal 1722 can be in communication with antennas 1706 and 1708, where antennas 1706 and 1708 transmit information to access terminal 1722 over forward link 1726 and receive information from access terminal 1722 over reverse link 1724. In a frequency division duplex system, communication links 1718, 1720, 1724 and 1726 can use different frequency for communication. For example, forward link 1720 may use a different frequency then that used by reverse link 1718.

Each group of antennas and/or the area in which they are designed to communicate can be referred to as a sector of the access point. In accordance with one aspect, antenna groups can be designed to communicate to access terminals in a sector of areas covered by access point 1700. In communication over forward links 1720 and 1726, the transmitting antennas of access point 1700 can utilize beamforming in order to improve the signal-to-noise ratio of forward links for the different access terminals 1717 and 1722. Also, an access point using beamforming to transmit to access terminals scattered randomly through its coverage causes less interference to access terminals in neighboring cells than an access point transmitting through a single antenna to all its access terminals.

An access point, e.g., access point 1700, can be a fixed station used for communicating with terminals and can also be referred to as a base station, an eNB, an access network, and/or other suitable terminology. In addition, an access terminal, e.g., an access terminal 1716 or 1722, can also be referred to as a mobile terminal, user equipment, a wireless communication device, a terminal, a wireless terminal, and/or other appropriate terminology.

Figure 18:
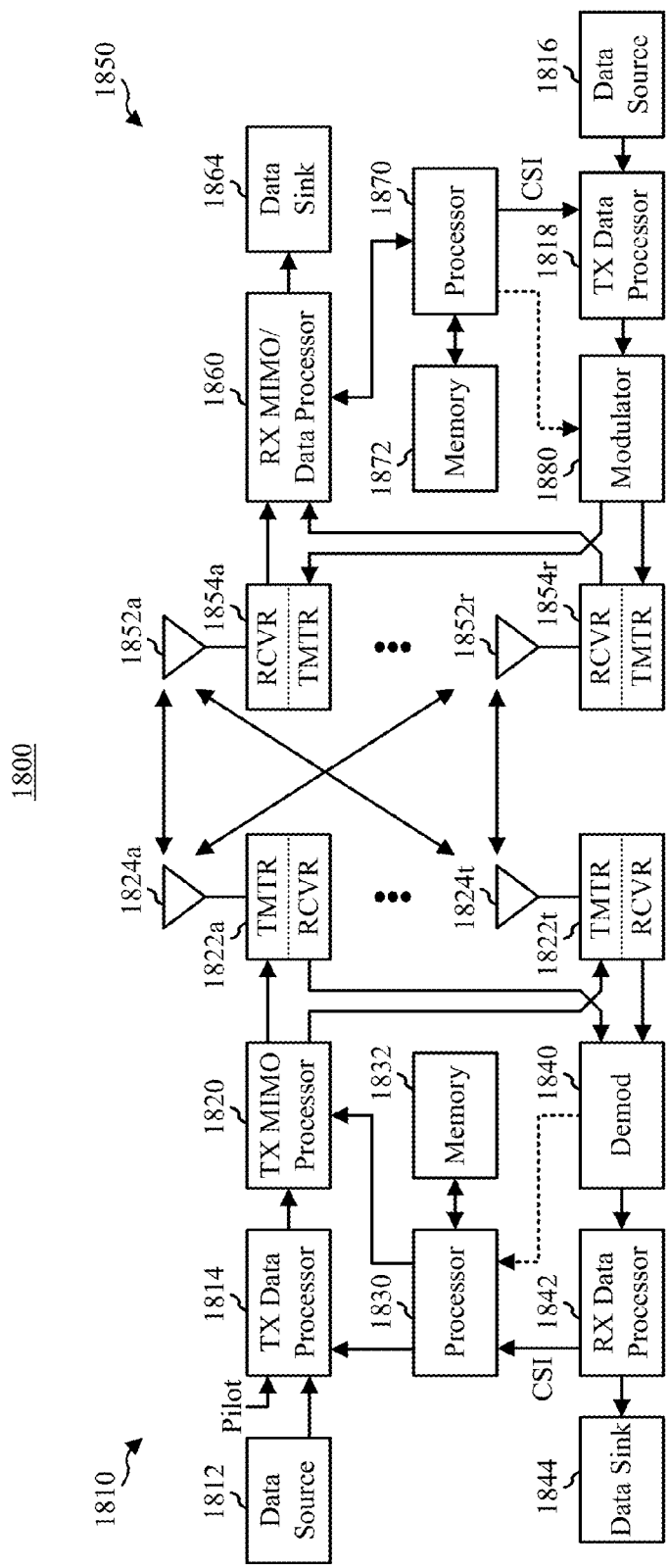
FIG. 18 is a block diagram illustrating an example wireless communication system in which various aspects described herein can function.

Referring now to FIG. 18, a block diagram illustrating an example wireless communication system 1800 in which various aspects described herein can function is provided. In one example, system 1800 is a multiple-input multiple-output (MIMO) system that includes a transmitter system 1810 and a receiver system 1850. It should be appreciated, however, that transmitter system 1810 and/or receiver system 1850 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1810 and/or receiver system 1850 described herein could be utilized in connection with a single output to single input antenna system.

In accordance with one aspect, traffic data for a number of data streams are provided at transmitter system 1810 from a data source 1812 to a transmit (TX) data processor 1814. In one example, each data stream can then be transmitted via a respective transmit antenna 1824. Additionally, TX data processor 1814 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1850 to estimate channel response. Back at transmitter system 1810, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1830.

Next, modulation symbols for all data streams can be provided to a TX processor 1820, which can further process the modulation symbols (e.g., for OFDM). TX MIMO processor 1820 can then provides $N_T$ modulation symbol streams to $N_T$ transceivers 1822a through 1822t. In one example, each transceiver 1822 can receive and process a respective symbol stream to provide one or more analog signals. Each transceiver 1822 can then further condition (e.g., amplify, filter, and upconvert) the analog signals to provide a modulated signal suitable for transmission over a MIMO channel. Accordingly, $N_T$ modulated signals from transceivers 1822a through 1822t can then be transmitted from $N_T$ antennas 1824a through 1824t, respectively.

In accordance with another aspect, the transmitted modulated signals can be received at receiver system 1850 by $N_R$ antennas 1852a through 1852r. The received signal from each antenna 1852 can then be provided to respective transceivers 1854. In one example, each transceiver 1854 can condition (e.g., filter, amplify, and downconvert) a respective received signal, digitize the conditioned signal to provide samples, and then processes the samples to provide a corresponding "received" symbol stream. An RX MIMO/data processor 1860 can then receive and process the $N_R$ received symbol streams from $N_R$ transceivers 1854 based on a particular receiver processing technique to provide $N_T$ "detected" symbol streams. In one example, each detected symbol stream can include symbols that are estimates of the modulation symbols transmitted for the corresponding data stream. RX processor 1860 can then process each symbol stream at least in part by demodulating, deinterleaving, and decoding each detected symbol stream to recover traffic data for a corresponding data stream. Thus, the processing by RX processor 1860 can be complementary to that performed by TX MIMO processor 1820 and TX data processor 1816 at transmitter system 1810. RX processor 1860 can additionally provide processed symbol streams to a data sink 1864.

In accordance with one aspect, the channel response estimate generated by RX processor 1860 can be used to perform space/time processing at the receiver, adjust power levels, change modulation rates or schemes, and/or other appropriate actions. Additionally, RX processor 1860 can further estimate channel characteristics such as, for example, signal-to-noise-and-interference ratios (SNRs) of the detected symbol streams. RX processor 1860 can then provide estimated channel characteristics to a processor 1870. In one example, RX processor 1860 and/or processor 1870 can further derive an estimate of the "operating" SNR for the system. Processor 1870 can then provide channel state information (CSI), which can comprise information regarding the communication link and/or the received data stream. This information can include, for example, the operating SNR. The CSI can then be processed by a TX data processor 1818, modulated by a modulator 1880, conditioned by transceivers 1854a through 1854r, and transmitted back to transmitter system 1810. In addition, a data source 1816 at receiver system 1850 can provide additional data to be processed by TX data processor 1818.

Back at transmitter system 1810, the modulated signals from receiver system 1850 can then be received by antennas 1824, conditioned by transceivers 1822, demodulated by a demodulator 1840, and processed by a RX data processor 1842 to recover the CSI reported by receiver system 1850. In one example, the reported CSI can then be provided to processor 1830 and used to determine data rates as well as coding and modulation schemes to be used for one or more data streams. The determined coding and modulation schemes can then be provided to transceivers 1822 for quantization and/or use in later transmissions to receiver system 1850. Additionally and/or alternatively, the reported CSI can be used by processor 1830 to generate various controls for TX data processor 1814 and TX MIMO processor 1820. In another example, CSI and/or other information processed by RX data processor 1842 can be provided to a data sink 1844.

In one example, processor 1830 at transmitter system 1810 and processor 1870 at receiver system 1850 direct operation at their respective systems. Additionally, memory 1832 at transmitter system 1810 and memory 1872 at receiver system 1850 can provide storage for program codes and data used by processors 1830 and 1870, respectively. Further, at receiver system 1850, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:
1. A method, comprising:
identifying data to be transmitted over one or more communication channels;
locating status information associated with the data, wherein the status information comprises at least one of a Packet Data Convergence Protocol (PDCP) status message associated with the one or more communication channels and a Radio Link Control (RLC) message;
detecting a transmission of a handover complete message;

in response to detecting the transmission of the handover complete message, prioritizing the status information in a first transmission queue; and transmitting the status information in a first transmission following detecting the transmission of the handover complete message, wherein the first transmission occurs prior to transmitting any of the data after detecting the transmission of the handover complete message.

2. The method of claim 1, wherein the status information comprises one or more RLC messages, the one or more RLC messages comprising at least one of acknowledgement (ACK) or negative ACK (NACK) information.

3. The method of claim 2, wherein the transmission of the handover complete message occurs between a wireless communication network and a user served by the wireless communication network.

4. The method of claim 1, wherein:

the method further comprises identifying a set of transmission queues comprising at least the first transmission queue and a second transmission queue, wherein the first transmission queue is associated with the status information and the second transmission queue is associated with the data transmitted after detecting the transmission of the handover complete message; and prioritizing the status information comprises placing the status information into the first transmission queue and placing the data in the second transmission queue.

5. The method of claim 4, wherein the first transmission queue comprises a common transmission queue associated with status information to be transmitted over a plurality of communication channels.

6. The method of claim 4, wherein prioritizing the status information further comprises causing the first transmission queue to be drained prior to removing data from the second transmission queue.

7. The method of claim 4, wherein prioritizing the status information further comprises placing status information associated with one or more real-time applications into the first transmission queue.

8. The method of claim 1, further comprising assigning a first indicator that identifies the status information and assigning a second indicator that identifies the data, wherein locating the status information is performed by analyzing the first indicator.

9. The method of claim 8, wherein assigning the first indicator is performed by setting a bit at a predetermined bit position within a data element to a first value upon determining that the data element comprises status information, and assigning the second indicator is performed by setting the bit to a second value upon determining that the data element does not comprise status information.

10. The method of claim 1, wherein:

locating the status information comprises identifying a list of communication channels for which status information is present and locating status information associated with respective communication channels based at least in part on the identified list; and transmitting the status information comprises transmitting respective listed status information over one or more communication channels for which the status information is present.

11. The method of claim 1, further comprising discarding status information corresponding to at least one application for which status information is not desired prior to transmission of the status information.

12. The method of claim 1, wherein the method is performed by an access point in a wireless communication network.

13. The method of claim 1, wherein the method is performed by a user equipment unit (UE).

14. The method of claim 1, wherein prioritizing the status information in a transmission queue comprises positioning the status information as the first element to be transmitted in the transmission queue.

15. The method of claim 1, wherein prioritizing the status information in a transmission queue comprises positioning status information associated with one or more real-time applications as the first element to be transmitted in the transmission queue.

16. A wireless communications apparatus, comprising:

a memory that stores data relating to one or more radio bearers and respective information associated with the one or more radio bearers, the information comprising at least one of status messages or data, wherein the status messages comprise at least one of a Packet Data Convergence Protocol (PDCP) status message associated with the one or more radio bearers and a Radio Link Control (RLC) message; and a processor configured to identify respective status messages among the information associated with the one or more radio bearers and to prioritize the respective status messages in a status radio bearer such that the status messages are transmitted in a first transmission following detection of a transmission of a handover complete message, wherein the first transmission occurs prior to transmitting any of the data relating to the one or more radio bearers that is remaining after detection of the transmission of the handover complete message.

17. The wireless communications apparatus of claim 16, wherein the status messages comprise RLC messages, the RLC messages comprising at least one of acknowledgement (ACK) or negative ACK (NACK) information.

18. The wireless communications apparatus of claim 16, wherein the processor is further configured to transmit respective status messages during a communication session between the wireless communications apparatus and at least one of a wireless communication network or a user equipment unit (UE).

19. The wireless communications apparatus of claim 16, wherein:

the memory further stores data relating to one or more data radio bearers (DRBs) associated with respective data elements and one or more status radio bearers associated with respective status messages; and the processor is further configured to transmit prioritize respective radio bearers such that status messages associated with respective status radio bearers are transmitted prior to the data relating to the one or more DRBs that is remaining after detection of the transmission of the handover complete message.

20. The wireless communications apparatus of claim 19, wherein the one or more status radio bearers comprise a common status radio bearer associated with status messages for a plurality of DRBs.

21. The wireless communications apparatus of claim 19, wherein the one or more status radio bearers comprise a set of status radio bearers that are respectively associated with corresponding DRBs.

22. The wireless communications apparatus of claim 16, wherein respective data elements and status messages comprise an indicator that identifies the respective data elements and status messages and the processor is further configured to identify respective status messages among the information associated with the one or more radio bearers at least in part by analyzing indicators associated with respective data elements and status messages associated with the one or more radio bearers.

23. The wireless communications apparatus of claim 22, wherein respective indicators are set for a data element or status message by setting a predetermined bit position within the data element or status message to a predefined value, the predefined value being a first value to indicate a data element or a second value to indicate a status message.

24. The wireless communications apparatus of claim 16, wherein the memory further stores data relating to a set of radio bearers on which status messages are located and the processor is further configured to prioritize respective status messages located on the radio bearers in the set of radio bearers.

25. The wireless communications apparatus of claim 16, wherein the processor is further configured to discard status messages relating to respective applications for which status messages are determined to be below a threshold level of utility.

26. The wireless communications apparatus of claim 16, wherein the wireless communications apparatus is a Node B.

27. The wireless communications apparatus of claim 16, wherein the wireless communications apparatus is a wireless terminal.

28. An apparatus operable in a wireless communication system, the apparatus comprising:
  means for identifying information to be transmitted over one or more logical channels;
  means for classifying the identified information into status signaling and data, wherein the status signaling comprises at least one of a Packet Data Convergence Protocol (PDCP) status message associated with the one or more logical channels and a Radio Link Control (RLC) message; and
  means for assigning priority levels to the identified information such that information classified as the status signaling is prioritized in a status radio bearer and transmitted in a first transmission following detection of a transmission of a handover complete message, wherein the first transmission occurs prior to transmitting any information classified as data after detection of the transmission of the handover complete message.

29. The apparatus of claim 28, wherein the status signaling comprises one or more RLC messages, the RLC messages comprising at least one of acknowledgement (ACK) or negative ACK (NACK) information.

30. The apparatus of claim 28, wherein:
  the means for identifying comprises means for identifying a set of radio bearers comprising one or more data radio bearers (DRBs) having respective data queued thereon and one or more status radio bearers having respective status signaling queued thereon; and
  the means for assigning comprises means for assigning priority levels to the set of radio bearers such that status signaling queued on the one or more status radio bearers is transmitted prior to data queued on the one or more DRBs upon detection of the transmission of the handover complete message.

31. The apparatus of claim 30, wherein the one or more status radio bearers comprise a common status radio bearer having status signaling associated with a plurality of DRBs queued thereon.

32. The apparatus of claim 30, wherein the one or more status radio bearers comprise a set of status radio bearers corresponding to with respective DRBs, the status radio bearers having status signaling associated with their respective corresponding DRBs queued thereon.

33. The apparatus of claim 28, wherein the means for classifying comprises:
  means for identifying respective indicators associated with the identified information, the indicators comprising one or more of status signaling indicators or data indicators; and
  means for classifying the identified information into status signaling and data at least in part by classifying identified information associated with a status signaling indicator as status signaling and classifying identified information associated with a data indicator as data.

34. The apparatus of claim 33, wherein the respective indicators associated with the identified information comprise a predefined bit value located at a predetermined bit position within the identified information, the predefined bit value being a first bit value to provide a status signaling indication or a second bit value to provide a data indication.

35. The apparatus of claim 28, wherein the means for classifying comprises:
  means for maintaining a list of logical channels for which status signaling is present; and
  means for classifying respective identified information as status signaling based at least in part on the maintained list.

36. The apparatus of claim 28, wherein the apparatus is one of a Node B or a user equipment unit (UE).

37. A computer program product, comprising:
  a non-transitory computer-readable medium, comprising:
    code for causing a computer to identify one or more radio bearers and respective information queued on the one or more radio bearers, the information comprising at least one of status messages or data, wherein the status messages comprise at least one of a Packet Data Convergence Protocol (PDCP) status message associated with the one or more radio bearers and a Radio Link Control (RLC) message;
    code for causing a computer to identify respective status messages among the information queued on the one or more radio bearers; and
    code for causing a computer to prioritize the respective status messages in a status radio bearer such that the respective status messages are transmitted in a first transmission following detection of a transmission of a handover complete message, wherein the first transmission occurs prior to transmitting the data queued on the one or more radio bearers that is remaining after detection of the transmission of the handover complete message.

38. The computer program product of claim 37, wherein the code for causing a computer to prioritize comprises code for causing a computer to prioritize the respective status messages with respect to a transmission of status messages associated with at least one of a handover between respective cells in a wireless communication system or a communication session between a wireless communication network and a user equipment unit (UE) served by the wireless communication network.

39. The computer program product of claim 37, wherein:
  the code for causing a computer to identify one or more radio bearers comprises code for causing a computer to identify one or more data radio bearers (DRBs) on which respective data are queued and one or more status radio bearers on which respective status messages are queued.

40. The computer program product of claim 39, wherein the one or more status radio bearers comprise a common status radio bearer on which status messages associated with a plurality of DRBs are queued.

41. The computer program product of claim 39, wherein the one or more status radio bearers comprise a set of status radio bearers that correspond to respective DRBs and on which status messages associated with the respectively corresponding DRBs are queued.

42. The computer program product of claim 37, wherein the code for causing a computer to identify respective status messages comprises:
  code for causing a computer to identify respective indicators associated with the information queued on the one or more radio bearers, the indicators comprising one or more of status message indicators or data indicators; and
  code for causing a computer to identify respective status messages at least in part by identifying information associated with a status message indicator queued on the one or more radio bearers.

43. The computer program product of claim 42, wherein the code for causing a computer to identify respective indicators comprises:
  code for causing a computer to analyze a predetermined bit position within respective information queued on the one or more radio bearers;
  code for causing a computer to identify information having a first value at the predetermined bit position as status messages; and
  code for causing a computer to identify information having a second value at the predetermined bit position as data.

44. The computer program product of claim 37, wherein the code for causing a computer to identify respective status messages comprises:
  code for causing a computer to maintain a set of radio bearers on which status messages are queued; and
  code for causing a computer to identify status messages queued on one or more radio bearers indicated by the maintained set.

\* \* \* \* \*